US011362525B2

(12) United States Patent
Feng et al.

(10) Patent No.: US 11,362,525 B2
(45) Date of Patent: Jun. 14, 2022

(54) FULL DIRECT-CURRENT BOOST/BUCK POWER TRANSMISSION SYSTEM AND METHOD

(71) Applicants: Lianghuan Feng, Sichuan (CN); Lang Feng, Sichuan (CN)

(72) Inventors: Lianghuan Feng, Sichuan (CN); Lang Feng, Sichuan (CN)

( * ) Notice: Subject to any disclaimer, the term of this patent is extended or adjusted under 35 U.S.C. 154(b) by 225 days.

(21) Appl. No.: 16/914,929

(22) Filed: Jun. 29, 2020

(65) Prior Publication Data

US 2020/0381927 A1 Dec. 3, 2020

Related U.S. Application Data

(63) Continuation of application No. PCT/CN2018/000407, filed on Dec. 5, 2018.

(30) Foreign Application Priority Data

Dec. 29, 2017 (CN) .......................... 201711471724.4

(51) Int. Cl.
*H02J 7/00* (2006.01)
*H02J 1/10* (2006.01)
*H02M 3/158* (2006.01)

(52) U.S. Cl.
CPC .............. *H02J 7/0024* (2013.01); *H02J 1/10* (2013.01); *H02J 7/0016* (2013.01); *H02M 3/1582* (2013.01)

(58) Field of Classification Search
CPC .......... H02J 7/0024; H02J 1/10; H02J 7/0016; H02M 3/1582

USPC ........................................................ 320/117
See application file for complete search history.

(56) References Cited

U.S. PATENT DOCUMENTS

| | | | |
|---|---|---|---|
| 6,583,522 B1* | 6/2003 | McNulty | H01L 31/02021 320/101 |
| 9,798,367 B2* | 10/2017 | Huang | G06F 1/26 |
| 2010/0076636 A1* | 3/2010 | Ichikawa | H02J 7/02 320/109 |
| 2011/0032733 A1* | 2/2011 | Watanabe | H02M 3/1584 363/21.14 |
| 2012/0105040 A1* | 5/2012 | Leipold | H02M 3/1584 323/284 |
| 2012/0119582 A1* | 5/2012 | Tajima | H02J 7/0024 307/71 |

(Continued)

FOREIGN PATENT DOCUMENTS

| | | |
|---|---|---|
| CN | 201160230 Y | 12/2008 |
| CN | 102570777 A | 7/2012 |

(Continued)

*Primary Examiner* — Suresh Memula

(57) ABSTRACT

A full DC buck-boost power transmission system comprises at least one DC power supply, at least one boost station, a high-voltage cable and at least one buck station connected in sequence. The boost station includes a first battery pack unit, and the buck station includes a second battery pack unit. The DC power supply, the boost station, the high-voltage cable and the buck station cooperate with each other, and the connection modes of the first battery pack unit and the second battery pack unit can be switched, so that the first battery pack unit and the second battery pack unit undergo the process of charging and discharging in different connection modes, realizing the storage, boost, transmission, buck and supply of the DC power.

9 Claims, 20 Drawing Sheets

(56) References Cited

U.S. PATENT DOCUMENTS

| | | | |
|---|---|---|---|
| 2013/0015805 A1 | 1/2013 | Teggatz et al. | |
| 2014/0300311 A1* | 10/2014 | Caren | H01M 10/441 320/103 |
| 2015/0028794 A1* | 1/2015 | Flett | H02M 7/487 320/101 |
| 2016/0241026 A1* | 8/2016 | Pehlke | H02J 1/10 |
| 2019/0149053 A1* | 5/2019 | Bala | H02M 3/3376 320/107 |
| 2019/0288547 A1* | 9/2019 | Jaensch | B60L 53/62 |
| 2020/0144822 A1* | 5/2020 | Hinterberger | H02J 3/381 |
| 2020/0176996 A1* | 6/2020 | Hinterberger | H02J 1/08 |
| 2021/0006076 A1* | 1/2021 | Rentel | H02J 7/0024 |
| 2021/0126471 A1* | 4/2021 | Srivastava | H02J 7/0019 |
| 2021/0313810 A1* | 10/2021 | Townsend | H02J 7/00032 |

FOREIGN PATENT DOCUMENTS

| | | | | |
|---|---|---|---|---|
| CN | 111987919 A | * | 11/2020 | H02M 5/4585 |
| DE | 102018116480 A1 | * | 1/2020 | |
| EP | 3772152 A1 | * | 2/2021 | H02J 7/00714 |
| WO | WO-2016000221 A | * | 1/2016 | H02J 7/0027 |
| WO | WO-2019127617 A1 | * | 7/2019 | H02J 1/10 |
| WO | WO-2020104064 A1 | * | 5/2020 | |
| WO | WO-2020204931 A1 | * | 10/2020 | H02J 3/38 |

* cited by examiner

FULL DIRECT-CURRENT BOOST/BUCK POWER TRANSMISSION SYSTEM AND METHOD

CROSS-REFERENCE TO RELATED APPLICATIONS

This application is a continuation of International Patent Application No. PCT/CN2018/000407 with a filling date of Dec. 5, 2018, designating the United States, now pending, and further claims the benefit of priority from Chinese Patent Application No. 201711471724.4 with a filing date of Dec. 29, 2017. The content of the aforementioned applications, including any intervening amendments thereto, is incorporated herein by reference.

TECHNICAL FIELD

The present application relates to power transmission, and more particularly to a full DC buck-boost power transmission system.

BACKGROUND

The electric power technology is developed starting from direct current (DC). In 1882, Edison Electric Light Company established the first DC power station in London. In the same year, Nikola Tesla invented the world's first alternating current (AC) generator. From 1884 to 1885, Hungarians K. Zipernowsky, O. Blathy and M. Deri proposed a core-type transformer technology and shell-type transformer technology. In April 1893, American A. E. Kennelly proposed that if the alternating current is a sine wave, the concept of "impedance" can be introduced to calculate the AC circuit based on the Ohm's law. Compared to DC whose voltage is difficult to be boosted and bucked, the voltage of AC can be easily changed using transformers, so that AC power transmission and AC power grid have developed rapidly, thereby forming a pattern of AC power generation-AC power transmission-AC power distribution.

With the extension of transmission distance and the increase of transmission power and the transmission voltage, various defects of AC power transmission technology in practical applications have been revealed. After weighing the economic benefits and operating characteristics of AC power transmission and DC power transmission, the DC transmission technology was reused.

In the 1950s, a DC power transmission technology based on AC power generation and AC power distribution has been invented. In the DC power transmission technology, the AC power at a transmission terminal is firstly rectified into DC power, which is sent to a receiving terminal via DC transmission wires; the DC power is inverted to AC power, and sent to a receiving terminal of the AC power grid. Since the boost and buck of the voltage can only be completed by AC transformers, the DC power transmission technology based on the above-mentioned structure is adopted. In 1914, the concept of a grid-controlled mercury arc valve capable of rectification and inverter was born, and the grid-controlled mercury arc valves were successfully developed more than ten years later. In 1954, the grid-controlled mercury arc valves were applied to DC power transmission, resulting in the establishment of a landmark DC power transmission system connecting the Swedish mainland and Gotland with submarine cables.

The development of the DC power transmission technology is marked by rectification and inversion. After 1977, silicon controlled rectifiers (SCRs) have replaced the grid-controlled mercury arc valves, which occupied the dominant position of DC power transmission for more than 20 years, resulting in substantial increases in transmission distance, transmission power and transmission voltage, thereby greatly increasing the number of DC power transmission systems. In the 1990s, flexible DC transmission technology was born, which is a new type of power transmission technology based on Voltage Source Converter (VSC), self-shutdown device and pulse width modulation (PWM) technology. Later, IEEE officially named the flexible DC transmission technology as Voltage Source Converter based High Voltage Direct Current (VSC-HVDC).

The VSC-HVDC power transmission technology has made great progress so far, which shows many advantages over the DC power transmission technology based on silicon controlled rectifiers and the AC power transmission technology. For example, the power transmission is more stable; the allowable working voltage of the cable insulation for DC is two times higher than that for AC; besides, the DC power transmission control system has advantages of fast response, accurate adjustment, easy operation and multi-objective control. Under the condition that the wire cross-sectional areas are the same and the available powers delivered are equal, a power loss of DC power transmission wires is about ⅔ of that of AC power transmission wires, and a transmission efficiency of the DC power transmission wires is twice or more than that of the AC power transmission wires. However, due to the large investment of the DC transmission converter station, the construction cost of the DC power transmission wires is extremely expensive. Therefore, it is crucial to promote the development of the VSC-HVDC transmission technology.

With the development of high power electronic components and control technologies thereof, the power electronic transformer (PET)-DC transformer, which realizes voltage conversion and energy transfer through power electronic conversion technology, has received more and more attention. This kind of DC transformer was proposed at the end of the last century, and its working principle is to achieve a voltage conversion from one DC voltage to another DC voltage or more DC voltages through high-frequency chopping, transformation, isolation, and high-frequency rectification. The PET-DC transformer has advantages of almost 100% equivalent duty ratio, simple structure, lower energy consumption than that of a power frequency transformer, and high power density through increasing switching frequency.

However, since the so-called "DC transformer" still needs to be realized by the AC transformers during the transformation, a DC-to-AC chopping link and an AC-to-DC rectifying link are still needed in the DC transformer. Therefore, the so-called "DC transformer" and the existing DC transformers have the same essence.

The proportion of renewable energy generation, especially photovoltaic power generation, is rising, so that the situation of transmission technology and engineering will undergo major changes. With photovoltaic power generation accounting for 2%, 5%, 10%, and more than 50% of the total power generation, an era of "DC power generation-DC power transmission-DC power distribution" is coming. Therefore, the full DC transformer power transmission technology will be a preferred choice to become a basic framework of the global energy Internet in the future.

SUMMARY

In order to solve the technical problems in DC to AC and AC to DC conversions during power transmission, the present disclosure provides a full DC boost-buck power transmission system.

The technical solutions of the disclosure are described as follows.

The present disclosure provides a full DC boost-buck power transmission system, comprising:

at least one DC power supply;
at least one boost station;
a high-voltage cable; and
at least one buck station;
wherein the at least one DC power supply, the at least one boost station, the high-voltage cable and the at least one buck station are electrically connected in sequence; the at least one boost station comprises a first battery pack unit; the at least one buck station comprises a second battery pack unit;

when the at least one boost station is electrically connected to the at least one DC power supply, battery packs in the first battery pack unit are connected in parallel for charging on a boost side;

when the charging on the boost side is completed, the at least one boost station is disconnected from the at least one DC power supply; a connection mode of the battery packs in the first battery pack unit is switched from parallel connection to series connection; and the battery packs in the first battery pack unit are electrically connected to the at least one buck station through the high-voltage cable;

battery packs in the second battery pack unit are connected in series for charging on a buck side;

when the charging on the buck side is completed, the at least one buck station is disconnected from the high-voltage cable; and a connection mode of the battery packs in the second battery pack unit is switched such that the second battery pack unit comprises at least one single battery pack subunit, at least one series subunit and at least one parallel subunit are respectively configured for power supply to their corresponding loads.

In an embodiment, after the charging on the buck side is completed, the at least one boost station is disconnected from the high-voltage cable; the battery packs in the first battery pack unit are connected in parallel and the at least one DC power supply is electrically connected to the at least one boost station for charging on the boost side again;

after the charging on the boost side is completed, the at least one boost station is disconnected from the at least one DC power supply again; the connection mode of the battery packs in the first battery pack unit is switched from parallel connection to series connection;

after the power supply from the at least one buck station is completed, the battery packs in the second battery pack unit are connected in series and electrically connected to the at least one boost station through the high-voltage cable, so as to perform charging on the buck side again.

In an embodiment, each of the at least one single battery pack subunit, each of the at least one series subunit and each of the at least one parallel subunit are respectively configured for power supply to a power grid whose voltage value is lower than the voltage outputted from the at least one DC power supply.

In an embodiment, there are a plurality of boost stations, a total nominal voltage of the first battery pack units in the plurality of boost stations is within a first preset standard voltage range; if there are a plurality of buck stations, a total nominal voltage of the second battery pack units in the plurality of buck stations is within a second preset standard voltage range.

In an embodiment, there are a plurality of DC power supplies and a plurality of boost stations, and the plurality of boost stations is electrically connected to a corresponding DC power supply, respectively.

In an embodiment, there are a plurality of boost stations, the first battery pack unit in each of the plurality of boost stations and the second battery pack unit adopt A-type ordinary battery packs; when the charging on the buck side is performing, a first unidirectional conductive element that only allows current to flow into the high-voltage cable is respectively provided between a positive electrode of a first series stack formed by the first battery pack unit in each of the plurality of boost stations and the high-voltage cable; and a second unidirectional conductive element that only allows current to flow out of the high-voltage cable is provided between the high-voltage cable and a positive electrode of a second series stack formed by the second battery pack unit.

In an embodiment, there are a plurality of boost stations, the first battery pack unit in each of the plurality of boost stations adopts A-type ordinary battery packs, and the second battery pack unit adopts B-type improved battery packs, wherein a third unidirectional conductive element that only allows current to flow into the battery pack is provided at a positive electrode of each of the B-type improved battery packs.

In an embodiment, there are a plurality of boost stations, the first battery pack unit in each of the plurality of boost stations adopts A-type ordinary battery packs, and the second battery pack unit adopts C-type improved battery packs, wherein a fourth unidirectional conductive element that only allows current to flow into the battery pack is provided at a positive electrode of each of the C-type improved battery packs.

In an embodiment, the at least one boost station comprised a plurality of boost substations connected in series; the plurality of boost substations are respectively installed at different locations, and a sum of output voltage of a first series sub-stack of the battery packs in each of the plurality of boost substations is equal to a total nominal voltage of the first battery pack unit.

Compared to the prior art, the present invention has the following beneficial effects.

The present disclosure provides a full DC boost-buck power transmission system, in which the at least one DC power supply, the at least one boost station, the high-voltage cable and the at least one buck station cooperate with each other, and the connection modes of the first battery pack unit and the second battery pack unit can be switched, so that the first battery pack unit and the second battery pack unit perform the process of charging and discharging in different connection modes, thereby realizing the storage, boost, transmission, buck and power supply of the DC power, constructing an open full DC transmission and transformation power grid, and achieving the goal of "DC power generation-DC power transmission-DC power distribution".

DETAILED DESCRIPTION OF EMBODIMENTS

The present disclosure will be further described in detail below with reference to the accompanying drawings and embodiments.

Figure 1:
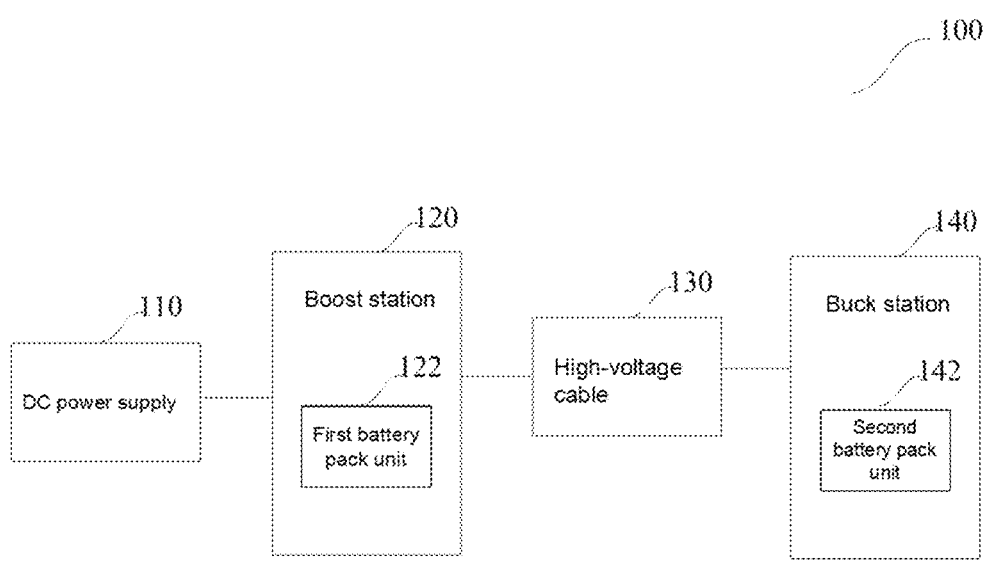
FIG. 1 is a block diagram of a full DC buck-boost power transmission system according to the present disclosure.

FIG. 1 is a block diagram of a full DC buck-boost power transmission system according to the present disclosure. Specifically, the full DC buck-boost power transmission system 100 includes a DC power supply 110, a boost station 120, a high-voltage cable 130 and a buck station 140.

The DC power supply 100, the boost station 110, the high-voltage cable 120 and the buck station 140 are electrically connected in sequence. the boost station 120 includes a first battery pack unit 122, and the buck station 140 includes a second battery pack unit 142.

When the boost station 120 is electrically connected to the DC power supply 110, battery packs in the first battery pack unit 122 are connected in parallel for charging on a boost side.

When the charging on the boost side is completed, the boost station 120 is disconnected from the DC power supply 110; a connection mode of the battery packs in the first battery pack unit 122 are switched from parallel connection to series connection; and the battery packs in the first battery pack unit are electrically connected to the buck station 140 through the high-voltage cable 130.

Battery packs in the second battery pack unit are connected in series for charging on a buck side.

When the charging on the buck side is completed, the buck station 140 is disconnected from the high-voltage cable 130; and a connection mode of the battery packs in the second battery pack unit 142 is switched such that the second battery pack unit 142 comprises at least one single battery pack subunit, at least one series subunit and at least one parallel subunit which are configured for power supply to their respective loads.

In the full DC buck-boost power transmission system 100, the DC power supply 110, the boost station 120, the high-voltage cable 130 and the buck station 140 cooperate with each other, and the connection modes of the first battery pack unit 122 and the second battery pack unit 142 can be switched, so that the first battery pack unit 122 and the second battery pack unit 142 undergo the process of charging and discharging in different connection mode, realizing the storage, boost, transmission, buck and power supply of DC power, constructing an open full DC power grid for transmission and transformation, and achieving the goal of "DC power generation-DC power transmission-DC power distribution".

In an embodiment, after the charging on the buck side is completed, the boost station 120 is disconnected from the high-voltage cable 130; the battery packs in the first battery pack unit 120 are connected in parallel and the DC power supply 110 is electrically connected to the boost station 120 for charging on the boost side again.

After the charging on the boost side is completed, the boost station 120 is disconnected from the DC power supply 110 again; the battery packs in the first battery pack unit 122 are switched from parallel connection to series connection.

After the power supply from the buck station is completed, the battery packs in the second battery pack unit 142 are connected in series and electrically connected to the buck station 120 through the high-voltage cable 130, so as to perform charging on the buck side again.

In an embodiment, each of the at least one single battery pack subunit, each of the at least one series subunit and each of the at least one parallel subunit are further configured for power supply to a power grid whose voltage value is lower than the voltage outputted from the least one DC power supply.

Specifically, the DC power supply 110 may be a pulsating DC power supply, or a DC power plant. In the case that the DC power supply 110 or the DC power plant continuously and steadily supplies power to the boost station 120, a specific implementation that the boost station 120 performs charging and connects to the power grid is as follows.

The boost station 120 is composed of a first battery pack unit 122 including a certain number of battery packs, and hardware and software serving the first battery pack unit 122.

The first battery pack unit 122 is composed of a certain number of battery packs with the same model, the same nominal voltage, and the same rated capacity, where the number of the battery packs is determined by the voltage of the power grid and the specifications of the battery packs. All battery packs are connected in parallel and are charged by the DC power supply 110 on the primary side. the DC power supply 110 may be any kind of a photovoltaic power plant, a fuel cell power plant, a wind power generator that directly outputs DC, a DC power supply rectified by AC power outputted from hydropower stations, a DC power supply rectified by AC power outputted from thermal power stations, a DC hydropower station and a thermal power station.

In order to achieve the above-mentioned functions, the hardware of the boost station should include a fixing mechanism and device for installing the battery packs, cables, interfaces, switches, transfer switches, power diodes, ground wires, and hardware for detecting and managing the battery packs. The cables, the interfaces, the switches, the transfer switches, the power diodes, the ground wires, and the hardware for detecting and managing the battery pack are configured for series connection, parallel connection and series-parallel interchange functions of the battery packs, and configured to connect the second battery pack unit 142 to the high-voltage cable 130, the DC power supply 110, and the ground wire. Based on the hardware of the boost station, the battery packs in the boost station 120 can be charged and connected to high voltage for remote power transmission after being installed properly. Besides, the battery packs can be replaced or updated as needed.

After the charging of the battery packs on the boost side is completed, the battery packs in the first battery pack unit 122 are connected in series to become a high voltage power supply. After connecting to the power grid through the high-voltage cable 130, the first battery pack unit enters a process of discharge and performs remote power transmission to the buck station 140. After the discharging is completed, the first battery pack unit 122 is disconnected from the high-voltage cable 130, and the battery packs in the first battery pack unit 122 are changed to be connected in parallel again, so as to receive low-voltage charging from the DC power supply 110 on the primary side. The above-mentioned process can be repeated cyclically to realize the function of the full DC buck-boost power transmission system.

A total nominal voltage and an optimal charging current of the battery packs of the first battery pack unit 122 not only depend on the output voltage and the output current of the above-mentioned DC power supply 110, but also depend on the grid voltage connected by the high-voltage cable 130. The charging conditions of the boost station 120 are as follows.

Each of the battery packs of the first battery pack unit 122 in the boost station 120 has the same specification, that is, each of the battery packs has the same nominal voltage, the same rated capacity and the same optimal charging current. A matching relationship between a nominal voltage $V_b$ and the actual voltage $V_c$ is:

$$V_b \approx V_c/1.2;$$

where the output voltage of the DC power supply 110 (or the DC power plant) in the primary side is $V_c$. It should be noted that when the above-mentioned rated capacity is reached in the charging, the actual voltage $V_c$ of each of the battery packs is more than 10% higher than the nominal voltage $V_b$.

For example, if the optimal charging current of each of the battery packs is $I_b$; the number of the battery packs in the first battery pack is n; the total nominal voltage of the first battery pack unit 122 is $nV_b$; and the current outputted by the DC power supply 110 is $I_c$; then, $I_b$ and $I_c$ should preferably satisfy the following relationship:

$$nI_b \geq I_c$$

In order to avoid overcharging, different standards and solutions for stopping charging should be formulated for different types of battery packs.

Further, the battery packs in the first storage battery pack unit 122 form a first series stack and are connected to the power grid through the high-voltage cable 130 for power transmission, the transmission condition should satisfy the following relationship:

$$V_w \approx nV_b;$$

where the nominal voltage of the power grid is $V_w$.

Therefore, the number of the battery packs are determined as follows:

$$n \approx V_w/V_b.$$

In the case of intermittent or random power generation, some basic principles and implementation methods for charging the boost station 120 and connecting the power grid through the high-voltage cable 130 are as follows.

If the DC power supply 110 is a photovoltaic power plant, the sum of the nominal battery energy of the first battery pack unit 122 is not less than the power generation capacity of the photovoltaic power plant in the summer daytime, so the relationship between the optimal charging current $I_b$ of each of the battery packs and the output current $I_{cp}$ from the photovoltaic power plant should satisfies:

$$nI_b \approx I_{cp};$$

where n is the total number of the battery packs connected in parallel for charging.

The photovoltaic power plant can output maximum power only when it matches a load with a specific resistance value, and there is a maximum power point on its output characteristic curve. In most cases, since the incident light intensity is lower than the standard light intensity (generally AM1.5), the output power is smaller than the nominal power, so that the load resistance value on the maximum power point becomes larger. Therefore, in order to make the photovoltaic power plant work near the maximum power point, the total number of the battery packs connected in parallel for charging needs to be reduced. The present disclosure provides a method of alternate charging in which all battery packs can obtain the same electric energy and the same voltage. Specifically, a part of the battery packs with a certain number are connected in parallel and charged for a certain period of time, and then other part of the battery packs in the same number are connected in parallel and charged for the same period of time. By this method, all battery packs are charged for the same period of time after a limited number of rounds, thereby completing a charging cycle. After completing a charging cycle, the number of the battery packs connected in parallel and charging time can be changed to charge the battery packs in the above-mentioned method, or all battery packs are connected in parallel to be charged. Therefore, the total number of the battery packs should be a multiple of 2 or 3, or their common multiple. If the solutions for alternately charging the battery pack is determined based on the incident light intensity, the function and hardware of the boost station 120 will be more complicated.

In the case that the DC power source 110 is a wind turbine generator in a wind farm: although the wind turbine generator generates electricity by cutting magnetic lines, its generator is a DC generator. Generally speaking, there are several to dozens of wind turbine generators installed in a wind farm, and the distance between each of the wind turbine generators is tens of meters or even hundreds of meters. In a general situation, a wind farm is provided with a boost station, and the most reasonable operation mode is as follows.

The number of wind turbine generators in a wind farm is set as m, and the wind turbine generators are respectively numbered and recorded as $WT_i$, where i=1, 2, 3, ... m. Each of the wind turbine generators charges several identical battery packs, where it is assumed that the i wind turbine generator $WT_i$ charges $k_i$ battery packs. In the practical operation, $k_i$ battery packs are firstly connected in parallel for charging from the wind turbine generators. After the charging is completed, $k_i$ battery packs are changed to be connected in series; then, the battery packs in all m wind turbine generators are connected in series, so that a series connection structure with $\Sigma k_i$ battery packs is formed, and connected to the power grid through the high-voltage cable 130 to supply power to the consumers. In an embodiment, all the wind turbine generators $WT_i$ have the same model and the same nominal power, and bear the same wind power, so that they share the same output power. The number of battery packs configured by m wind turbine generators is the same as k, so that there are $k_m$ battery packs connected in series and connected to the power grid.

When the boost station 120 is disconnected from the DC power supply 110, each of the battery packs in the first battery pack unit 122 needs to meet the following conditions to stop being charged.

(1) A total voltage of the battery packs in the first battery pack unit 122 reaches a preset specified voltage of the high-voltage cable 130 connected to the power grid, where the preset specified voltage may has a certain difference from the total nominal voltage of the first battery pack unit 122, and the difference is within an acceptable range of engineering error.

(2) The battery pack in the first battery pack unit 122 should be prevented from being overcharged, where the charging standards and methods vary according to the type of battery. Generally, there will be a sufficiently long time process from the total voltage of the battery packs reached to the preset specified voltage to each of the battery packs in the first battery pack unit 122 is overcharged after connecting to the power grid. Therefore, the boost station 120 may be controlled to stop charging at an advantageous, or appropriate, or necessary, or emergency moment during the process.

After the discharge of the first battery pack unit 120 is completed, all the battery packs in the first battery pack unit 122 are disconnected from the high-voltage cable 130, and changed to be connected in parallel for being charged by the DC power supply 110. The first battery pack unit 122 should meet the following conditions to stop discharging.

(1) The actual total voltage of the battery packs in the first battery pack unit 122 connected in series is lower than the preset specified voltage connected to the power grid;

(2) It should be avoided that each of the battery packs in the first battery pack unit 122 is over-discharged, i.e., when the actual total voltage of the boost station 120 or the voltage of a considerable number of battery packs is equal to a voltage after charged, the process of discharge should be stopped (otherwise, the voltage of each of the battery packs is too low, even to zero).

Therefore, the discharge can be stopped according to favorable, necessary, or emergency reasons before the two above-mentioned conditions are met.

If the DC power source 110 of the boost station 120 is a photovoltaic power station, the charging can be started in the morning and stopped in the evening. In the evening, the DC power source 110 is connected to the power grid through the high-voltage cable 130 to charge the buck station 140 on the power consumption terminal, and complete the charging. One of the tasks of the boost station 120 is to start charging and stop charging according to a requirement determined by factors such as latitude and date.

The buck station 140 is composed of a second battery pack unit 142 including a certain number of battery packs, and hardware and software serving the second battery pack unit 142.

The second battery pack unit 142 is composed of a certain number of the battery packs with the same charging and discharging characteristics and the same optimal charging current, where the number of the battery packs is determined by the grid voltage, the load demand, and the specifications of the battery pack. In the second battery pack unit 142, all the battery packs are connected in series and connected to the power grid through the high-voltage cable 130 for charging. After the charging on the buck side is completed, all the battery packs are disconnected from the high-voltage cable 130, and form a plurality of new DC power supply to supply power to the loads (electrical appliances) and electricity consumers, or connected in parallel to be a power supply with low voltage and high current to supply power to the loads, or connected in series to form a DC power supply with different voltages to supply power to the loads, microgrids, distributed power grid and local power grid. After the discharge of each of the battery packs in the second battery pack unit 142 is completed, all the battery packs are disconnected from the load and the load grid, and are changed to be connected in series again, and connected to the power grid through the high-voltage cable 130 for charging. The second battery pack unit 142 operates repeatedly in this way according to the above-mentioned process.

The hardware of the boost station includes a fixing mechanism and device for installing the battery packs, cables, interfaces, switches, transfer switches, power diodes and ground wires. The cables, the interfaces, switches, transfer switches, power diodes and ground wires are configured for series connection, parallel connection and series-parallel interchange of the battery packs, separating and combining the charged battery packs, and connecting the charged battery packs to the high-voltage cable 130, loads and the ground wire. Based on the hardware of the buck station, the battery packs in the buck station 140 can be charged and connected to the loads so as to supply power to the users after installed properly. Besides, the battery packs can be replaced or updated as needed.

A nominal voltage, a rated capacity of the battery pack string of the second battery pack unit 142 and the optimal charging current are determined by the following conditions.

The selection of each of the battery packs in the second battery pack unit 142 is not restricted by the specifications. The optimal charging current of all battery packs must be the same, while their nominal voltages and rated capacities can be different, but the nominal value and number of voltage, current intensity of the battery pack string to be charged are determined by the type and number of loads.

The actual total voltage $V_{bc}$ of the charged battery string is as follows:

$$V_{bc} \approx V_w / 1.2$$

where $V_w$ is an actual output voltage of the power grid transmitting through the high-voltage cable 130.

According to requirements of the loads, the charged battery pack string forms at least one of a series subunit (a series stack), a parallel subunit, and a single battery pack subunit. During the charging in the buck station, it is necessary to set the conditions for stopping charging properly, where the battery packs stop charging based on the following conditions.

The specific standards and methods for avoiding overcharged of the battery packs vary according to the type of battery pack. Generally, when the actual total voltage of the battery pack string has reached the charged voltage, the charging should be stopped and the battery packs in the buck station is disconnected from the high-voltage cable 130 in the power grid. Before this time, the charging of the battery pack string can be stopped according to favorable, necessary, or emergency reasons. If the buck station 140 adopted the B-type improved battery pack or the C-type improved battery pack defined in the present disclosure, when the voltage of the battery packs reaches the charged voltage, the positive electrode and the negative electrode of the battery pack are bridged, and other battery packs continue charging until the percentage of the remaining battery packs to the number of original battery packs is lower than a proportional threshold, the charging is immediately stopped and the battery packs are disconnected from the power grid, where the proportional threshold should be determined according to the charged voltage of the battery packs.

Since the battery packs of the buck station 140 are disconnected from the power grid and become the power supplies to supply power to their respective loads, and their processes of discharge are different, the time of charging for each of the battery packs will be different. The battery packs cannot be over-discharged in practical applications. Therefore, The time of stopping power supply of each of the battery packs is determined by detecting the output voltage or output current of each battery pack in the second battery pack unit 142. After all the battery packs in the buck station 140 are disconnected from the loads, the battery packs are changed to be connected in series and connect to the power grid through the high-voltage cable 130.

When the second battery pack unit 142 is separated into a plurality of series subunits, a plurality of parallel subunits and a plurality of single battery pack subunits, in order to increase the security of low-voltage users, the series subunit with the most battery packs should be placed closer to a high voltage terminal in the power grid.

In order to ensure the normal and stable realization of the battery packs, they are required to be are required to be effectively managed by the boost station 120 and the buck station 140. As the increase of the output voltage and output current of the boost station 120, the total number of battery packs contained in the boost station and the buck station may be as high as hundreds of thousands or even millions. After comprehensive consideration of various factors, the battery pack is adopted as the main component in the present invention. Compared to the battery, the number of the battery packs to be managed is dozens or even hundreds of times smaller than the number of batteries. However, regardless of the number of battery packs, the management of the battery packs by these two stations is a necessary, even a complex and burdensome task.

The basic tasks of the boost station 120 and the buck station 140 should further include the monitoring and management of the battery packs, that is, the status of each of the battery packs during operation is monitored, whether they are normal or aging or failing is determined, so as to inspect, maintain and replace the battery pack inspection, maintenance and replacement in the shutdown phase.

Unlike other appliances, temperature has an important influence on the charging, storage and discharge of the battery pack, and it is necessary to avoid them operating at low temperatures. Therefore, the temperature factor should be considered when designing the boost station and the buck station, and the temperature needs to be detected and controlled during operation.

The storage capacity of each of the battery packs is calculated by the product of discharge current and time. Therefore, the hardware and software for detecting the inflow, storage and outflow of electricity in real time are provided in each of the stations, where the structure of the hardware and software in the buck station 140 is particularly complicated.

In summary, the hardware for managing the battery packs should include: a certain number voltmeters and ammeters (the number is one more than the number of battery packs), more temperature measuring points and infrared temperature probes than the number of battery packs, and timers matched to the above-mentioned measuring devices.

The power grid is an indispensable main part in the present disclosure for managing the system. However, there are some differences in function between the power grid in the present disclosure and the existing transmission system as follows.

In the present disclosure, the power grid is not fixedly connected to the power station and the user. Since the boost station 120 and the buck station 140 in the present disclosure are also energy storage power stations, they can not only tolerate the peak or trough of power generation and power consumption, but also tolerate a longer period of disconnection from the power grid. This kind of power grid has the following advantages:

the power grid is easy to be extend and managed; it can work independent or work together by connecting the stations and the users; it has distributed characteristics; and it does not require high voltage.

The voltages of the boost station 120 and the buck station 140 are regulated accordingly to maintain the nominal voltage of the power grid, where the nominal voltage of the power grid≈the output voltage of the boost station 120≈the input voltage of the buck station 140×1.2.

The boost station 120 is connected to the buck station 140 through the high-voltage cable 130 in the power grid in the following ways: one boost station 120 is connected to one buck station 140 through the high-voltage cable 130; or one boost station 120 is connected to several buck stations 140 through the high-voltage cable 130; or several boost stations 120 are connected to one buck station 140 through the high-voltage cables 130; or several boost stations 120 are connected to several buck stations 140 through the high-voltage cables 130.

If one boost station 120 is connected to one buck station 140 through the high-voltage cable 130, a discharging process of the boost station 120 is a charging process of the buck station 140. In order to ensure that the battery pack is not overcharged or over-discharged, the roles of the boost station and the buck station cannot be interchanged.

The disclosure further proposes an embodiment to realize the interconnection between several boost stations 120 and several buck stations 140. In the embodiment, the role of each of the boost stations or the buck stations cannot be changed, where the boost station can only be charged by the DC power station or the DC power supply 110 rectified by the AC power station. Specifically, an unidirectional conductive device is required to be installed between various stations and the high-voltage cable 130 in the power grid, or a battery pack with an unidirectional conductive device is used. As a result, each of the boost station can charge all the boost stations, and each of the buck stations receives charging from all the boost stations, where any two of the stations can be connected through the high-voltage cables. This structure makes the power grid open, which not only helps the expansion and extension of the power grid, and but also simplifies the topology and load calculation of the power grid.

In an embodiment, of there are a plurality of boost stations 120 in the system, the total nominal voltage of the first battery pack unit 122 in each of the boost stations 120 is within the same first preset standard voltage range, the difference between the first preset standard voltage range and the nominal voltage of the power grid connected to the high-voltage cable 130 is within an allowable engineering error range, and only in this way can ensure that each of the boost stations 120 connected to the power grid through the high-voltage cable 130 does not cause impact on the power grid. Similarly, when there are a plurality of buck stations 140 in the system, the total nominal voltage of the second battery pack unit 142 in each of the buck stations 140 is within the same second preset standard voltage range, the difference between the second preset standard voltage range and the nominal voltage of the power grid connected to the high-voltage cable 130 is within an allowable engineering error range, and only in this way can each ensure that each of the buck stations 140 connected to the power grid through the high-voltage cable 130 does not cause impact on the power grid. The power grid should monitor all the current flowing out of the boost stations 120 and the current flowing into the buck stations 140, as well as the current direction and magnitude at each node in all power wires. When the load of a certain section of the high-voltage cable 130 in the power grid exceeds the design value is monitored, adjustment should be made immediately. This adjustment function is endowed when the power grid is designed.

In an embodiment, FIGS. 2A-D shows a circuit of the full DC buck-boost power transmission system in different working states.

In the drawings:

GYDL: a high-voltage cable 130 (i.e., the high-voltage power grid); XDCZ00: a first battery pack unit 122; XDCZ11: a second battery pack unit 142; the second battery pack unit 142 includes a single battery pack subunit 142a, a series subunit 142b and a parallel subunit 142c; K01: a switch 01, a single-pole double-throw switch; when it is connected to the DC power supply 110, all the battery packs in the first battery pack unit 122 connect in parallel for charging; when it is connected to the GYDL, all battery packs in the first battery pack unit 122 form a first series stack to connect to the power grid; K03: a switch 03, a single-pole single-throw switch; DL0: a cable 0; DL8: a cable 8; ZLJK1: a DC interface 1, configured to connect to the DC power supply 110, where the ZLJK1 is connected to the positive electrode of the battery packs XDCZ00 in the first battery pack unit 122; FZJK1: a load interface 1, an interface between the power supply (the series subunit 142b) and the loads, and is connected to an positive electrode of each of the battery packs in the series subunit 142b; FZJK2: a load interface 2, an interface between the power supply (the parallel subunit 142c) and the load, which is connected to an positive electrode of each of the battery packs in the parallel subunit 142c; and FZJK3: a load interface 3, an interface between the power supply (the single battery pack subunit 142a) and the load, which is connected to an positive electrode of the battery pack in the single battery pack subunit 142a.

Figure 2A:
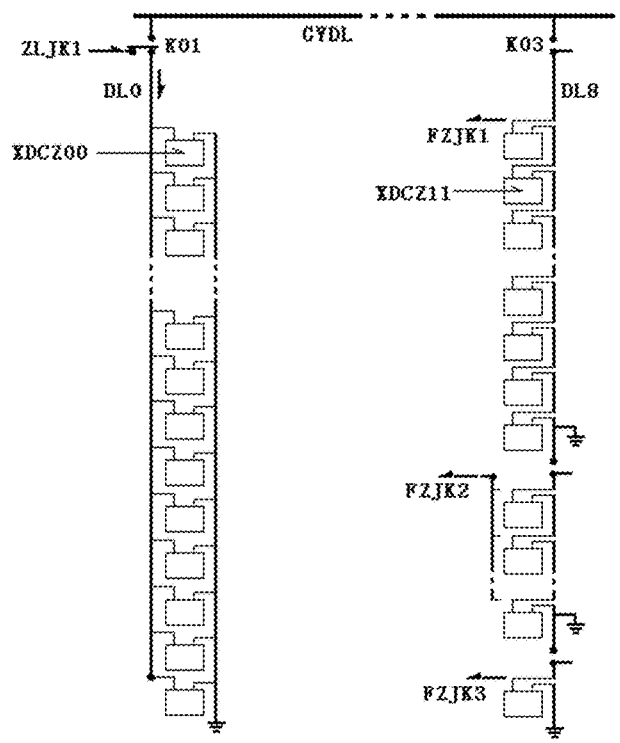
FIGS. 2A-D are circuit diagrams of the full DC buck-boost power transmission system in different working states according to an embodiment of the present disclosure.

As show in FIG. 2A, in the circuit of the full DC buck-boost power transmission system, the DC power supply 110 charges the first battery pack unit 122, where each of the battery packs in the second battery pack unit 142 is neither connected to the power grid nor to the load. A first part of the battery packs in the second battery pack unit 142 is connected in series to form the series subunit to supply power to the load; a second part of the battery packs in the second battery pack unit 142 is connected in parallel to be the parallel subunit to supply power to the load; and a third part of the battery packs in the second battery pack unit 142 form the single battery pack unit to independently supply power to the load.

Figure 2B:
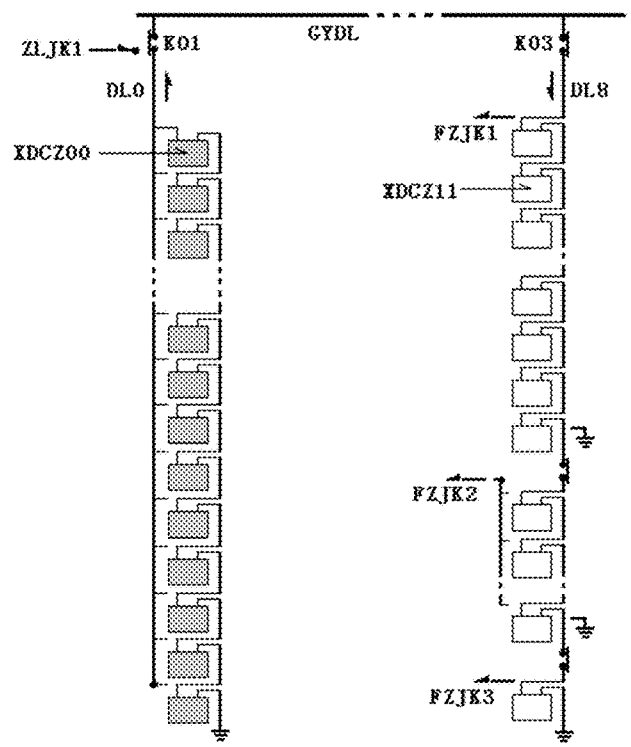

As shown in FIG. 2B, the first battery pack unit 122 is connected to the power grid through the high-voltage cable 130 to charge the second battery pack unit 142, where the first battery pack unit 122 forms a first series stack and is connected to the power grid through the high-voltage cable 130 for remote power transmission, and the second storage battery pack unit 142 forms a second series stack and is connected to the power grid through the high-voltage cable 130 to be charged.

Figure 2C:
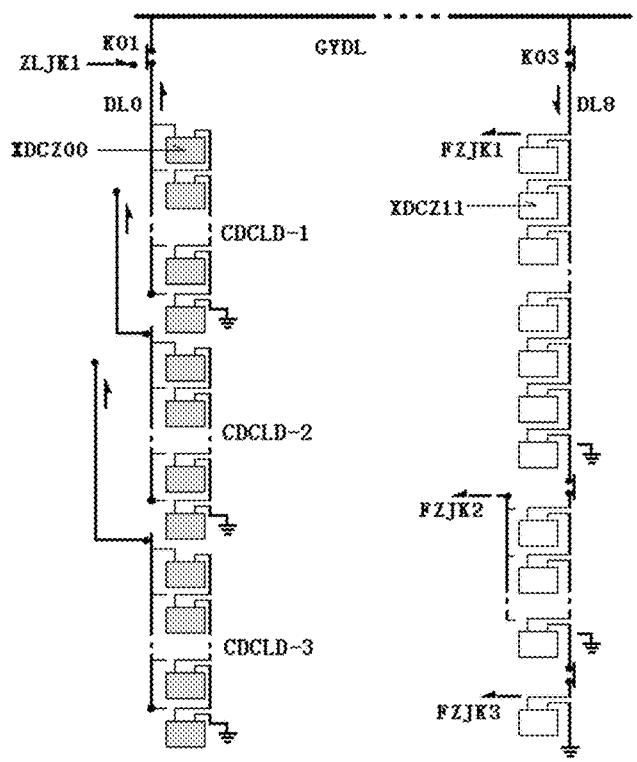

As shown in FIG. 2C, the first series stack in the first battery pack unit 122 is divided into three first series sub-stacks (CDCLD-1, CDCLD-2 and CDCLD-3), where each of the series sub-stack has the same number of battery packs, and the number of each of the series sub-stack is ⅓ of the total number of battery packs in the first battery pack unit 122. The series sub-stacks are alternately connected to the power grid to charge the second battery pack unit 142.

Figure 2D:
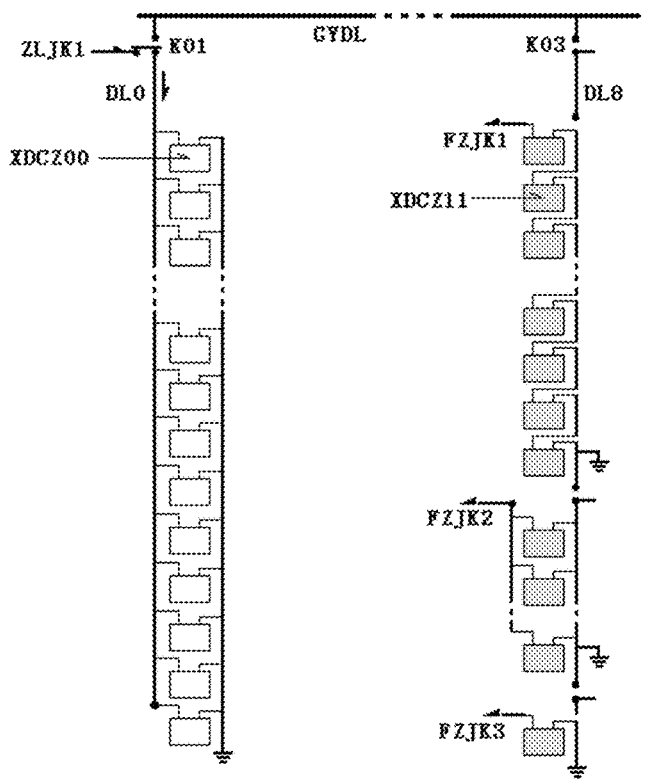

As shown in FIG. 2D, the battery packs in the first battery pack unit 122 are connected in parallel and charged by the DC power supply 110 again. At this time, the second series stack in the second battery pack unit 142 is separated into three power supplies, including a series subunit with a plurality of battery packs connected in series, a parallel subunit with a plurality of battery packs connected in parallel, and a single battery pack subunit. The series subunit, the parallel subunit and the single battery pack subunit are respectively connected to their load interfaces to supply power to their loads.

In an embodiment, the boost station 120 includes a plurality of boost substations connected in series, where the plurality of boost substations are respectively installed at different locations, and a sum of output voltage of the first series sub-stack of the battery packs in each of the boost substations is equal to the total nominal voltage of the first battery pack unit 122.

When the boost substations are installed at different locations, each of the booster substations is provided with a primary DC power supply 110 for charging itself, where these DC power supplies 110 can be installed at different locations, and they can belong to different types. The total number of battery packs in the boost station 120 is determined by the voltage in the power grid and the nominal voltage of the battery pack, but the sum of the output voltages of the first series sub-stack of the battery packs in each of the boost substations should be equal to the total nominal voltage of the first battery pack unit 122.

In an embodiment, if there are a plurality of boost stations 120, each of the battery packs in the first battery packs 122 and each of the battery packs in the second battery pack unit 142 is an A-type ordinary battery packs. When the charging on the buck side is performing, a first unidirectional conductive element that only allows current to flow into the high-voltage cable 130 is provided between a positive electrode of a first series stack formed by the first battery pack unit 122 in each of the boost stations and the high-voltage cable 130; and a second unidirectional conductive element that only allows current to flow out of the high-voltage cable 130 is provided between the high-voltage cable 130 and a positive electrode of a second series stack formed by the second battery pack unit 142.

In an embodiment, if there are a plurality of boost stations 120, each of the battery packs in the first battery pack unit 122 is an A-type ordinary battery pack, and each of the battery packs in the second battery pack 142 unit is a B-type improved battery pack, wherein a third unidirectional conductive element that only allows current to flow into the battery pack is provided at a positive electrode of each of the B-type improved battery pack.

In an embodiment, if there are a plurality of boost stations 120, each of the battery packs in the first battery pack unit 122 is an A-type ordinary battery pack, and each of the battery packs in the second battery pack unit 142 is a C-type improved battery pack, wherein a fourth unidirectional conductive element that only allows current to flow into the battery pack is provided at a positive electrode of each of the C-type improved battery pack.

In an embodiment, the first unidirectional conductive element, the second unidirectional conductive element, the third unidirectional conductive element and the fourth unidirectional conductive element are diode elements.

Figure 3A:
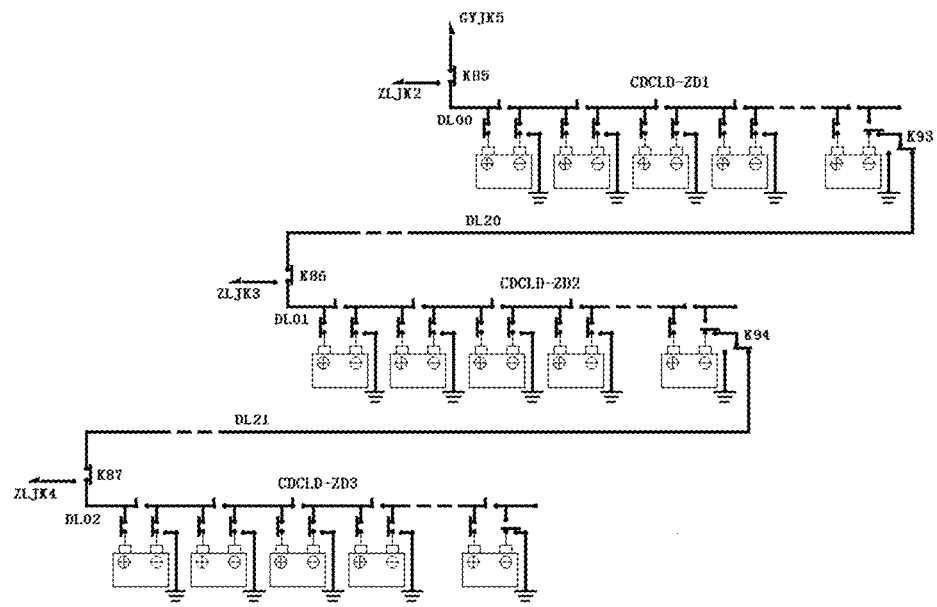
FIG. 3A shows a circuit in which a first battery pack unit of a boost station is connected to a power grid through a high-voltage cable for discharging.

FIG. 3A shows a circuit in which the first battery pack unit 122 of the boost station 120 is connected to the power grid through the high-voltage cable 130 for discharging, and the first series stack of the first battery pack unit 122 in the boost station 120 is formed by connecting three different series sub-stacks (CDCLD-ZD1, CDCLD-ZD2 and CDCLD-ZD3) in series.

In the drawing:

GYJK5: a high-voltage cable interface 5; DL00, DL01, DL02, DL20 and DL21: cables; K85: a switch 85, a single-pole double-throw switch configured to connect the DL00 to the GYJK5; K86: a switch 86, a single-pole double-throw switch configured to connect the DL20 to the DL01; K87: a switch 87, a single-pole double-throw switch configured to connect the DL21 to the DL02; K93: a switch 93, a single-pole double-throw switch configured to connect the negative electrode of the first series sub-stack CDCLD-ZD1 to DL20; and K94: a switch 94, a single-pole double-throw switch configured to connect the negative electrode of the second series sub-stack CDCLD-ZD2 to the DL21.

Figure 3B:
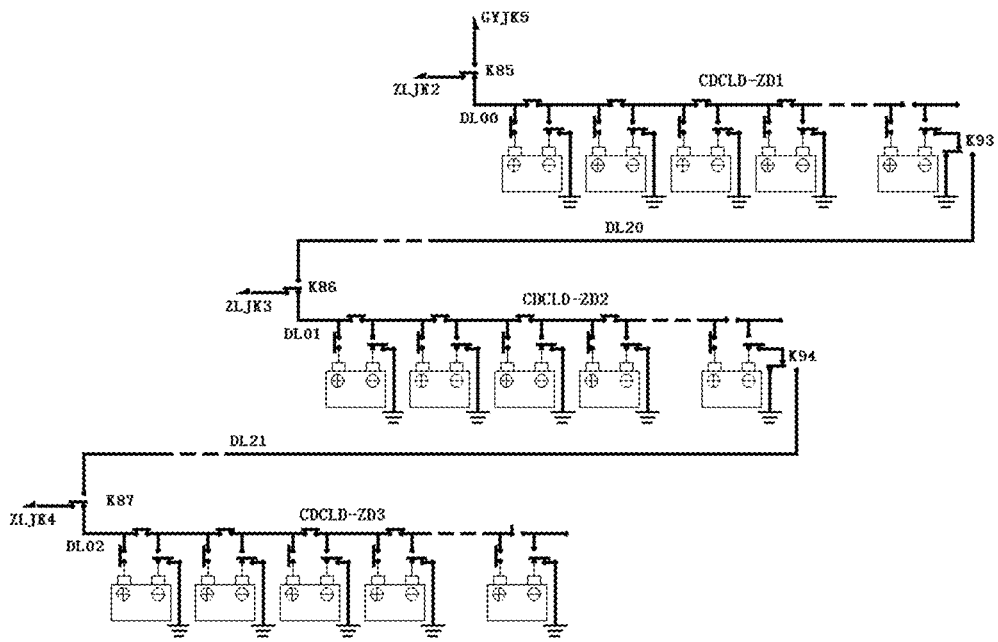
FIG. 3B shows the circuit in FIG. 3A, in which the first battery pack unit of the at least one boost station is charging on a boost side.

FIG. 3B shows the circuit in FIG. 3A, in which the first battery pack unit of the boost station is charging on the boost side. Any two battery packs in each of the series sub-stacks are connected in parallel, and each of the first series sub-stacks is respectively connected to the DC power supply 110 for charging in the boost side.

Figure 4:
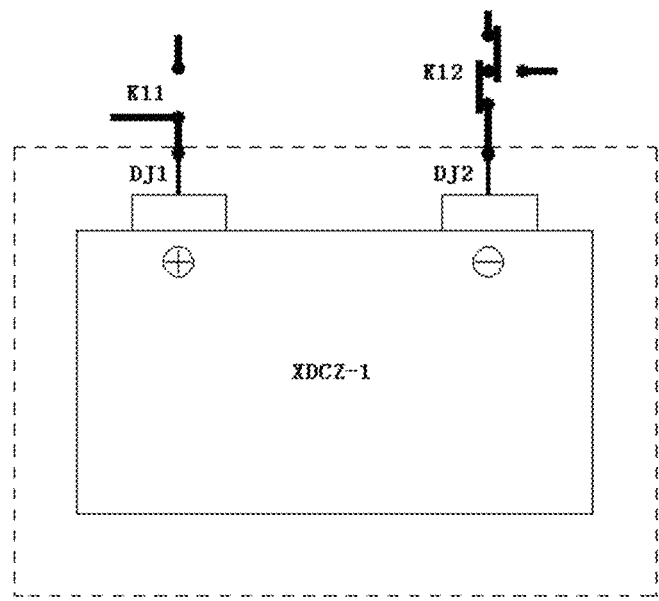
FIG. 4 shows an A-type battery pack according to an embodiment of the present disclosure.

FIG. 4 shows an A-type battery pack according to an embodiment of the present disclosure.

In the drawing:

XDCZ-1: an A-type ordinary battery pack, includes a plurality of common batteries connected in parallel or in series; DJ1: a positive electrode of the battery pack; and DJ2: a negative electrode of the battery pack.

In practical applications, when the boost station 120 and the buck station 140 adopt the A-type ordinary battery packs, the positive electrode of each of the A-type ordinary battery packs is provided with a single-pole double-throw switch K11, and the negative electrode of each of the A-type ordinary battery packs is provided with a single-pole double-throw switch K12.

Figure 5:
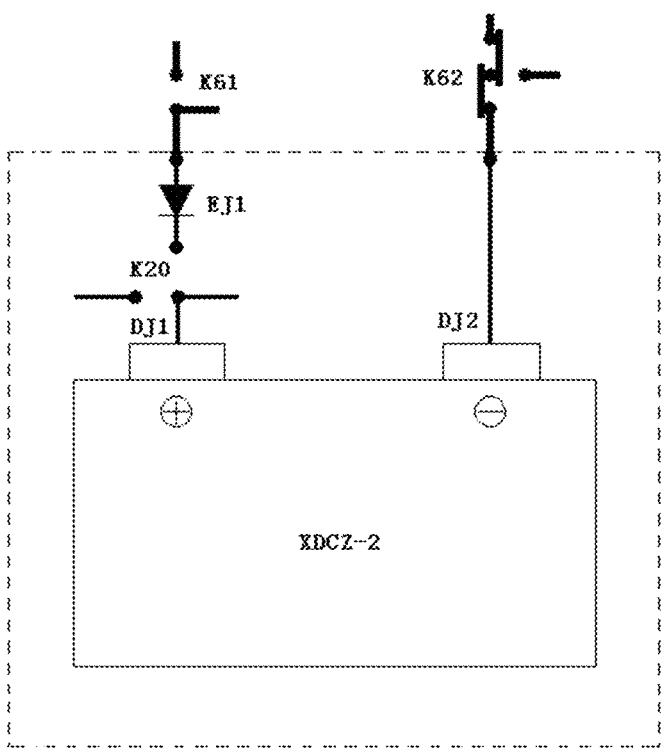
FIG. 5 shows a B-type improved battery pack according to an embodiment of the present disclosure.

FIG. 5 shows a B-type improved battery pack according to an embodiment of the present disclosure.

In the drawing:

DJ1: a positive electrode of the battery pack; DJ2: a negative electrode of the battery pack; a third unidirectional conductive element (diode EJ1) is provided at the positive electrode of the battery pack XDCZ-2 to allow current to flow into the battery pack XDCZ-2 and prevent current from flowing out of the XDCZ-2. A single-pole double-throw switch K20 is provided between the diode EJ1 and the positive electrode of the second battery pack XDCZ-2. When the positive electrode of the battery pack XDCZ-2 is connected to the diode EJ1 through the K20 for charging; when the K20 is connected to the load, the battery pack XDCZ-2 supply power to the load. In addition, a single-pole double-throw switch K61 is provided at the positive electrode of the buck station 140, and a single-pole double-throw switch K62 is provided at the negative electrode of the buck station 140.

Figure 6:
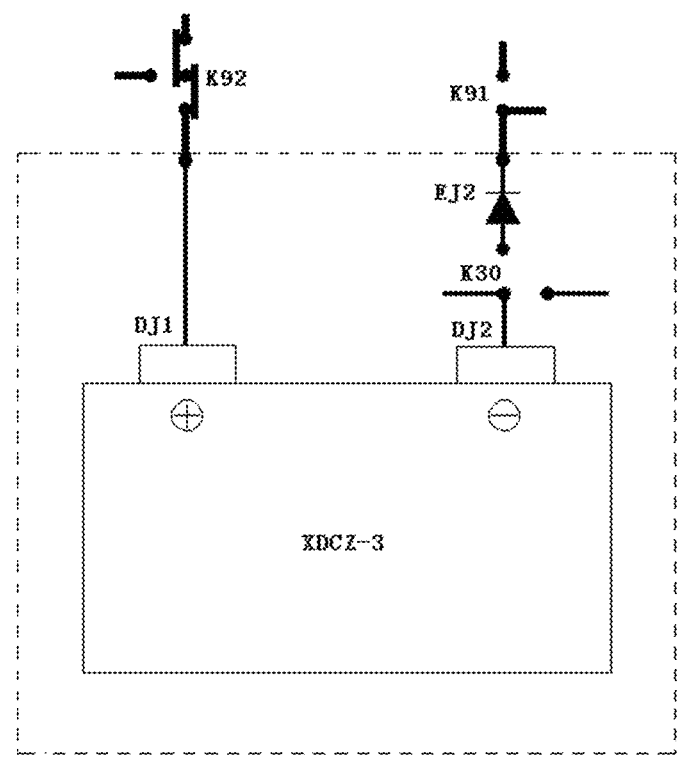
FIG. 6 shows a C-type improved battery pack according to an embodiment of the present disclosure.

FIG. 6 shows a C-type improved battery pack according to an embodiment of the present disclosure.

In the drawing:

XDCZ-3: a battery pack unit including a plurality of common batteries connected in parallel or in series; DJ1: a positive electrode of the battery pack; DJ2: a negative electrode of the battery pack; a fourth unidirectional conductive element (diode EJ2) is provided on the positive electrode of the battery pack XDCZ-3; K30: a single-pole double-throw switch; K91 and K92 are respectively a switch provided on the C-type improved battery pack in the buck station 140.

Figure 7A:
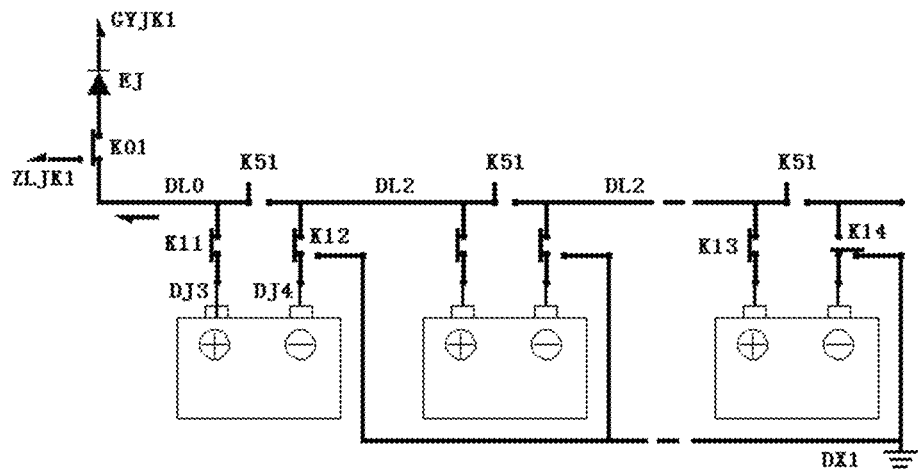
FIG. 7A shows a circuit according to an embodiment of the present disclosure, in which the first battery pack unit in the at least one boost station adopting the A-type ordinary battery packs is connected to the power grid through the high-voltage cable for discharging.

FIG. 7A shows a circuit in which the first battery pack unit in the boost station adopting the A-type ordinary battery packs is connected to the power grid through the high-voltage cable for discharging according to an embodiment of the present disclosure; in which:

EJ: a diode; DL0 and DL2: cables; K01, K12 and K14: single-pole double-throw switches; DX1: a ground wire; K13 and K51: single-pole single-throw switches; and the first battery pack unit 122 is connected to the power grid through the high-voltage cable 130 for remote transmission. Each of the A-type ordinary battery pack is fully charged and connected in series to form the first series stack, and further connected to the high-voltage cable 130 through the high-voltage cable interface GYJK1.

Figure 7B:
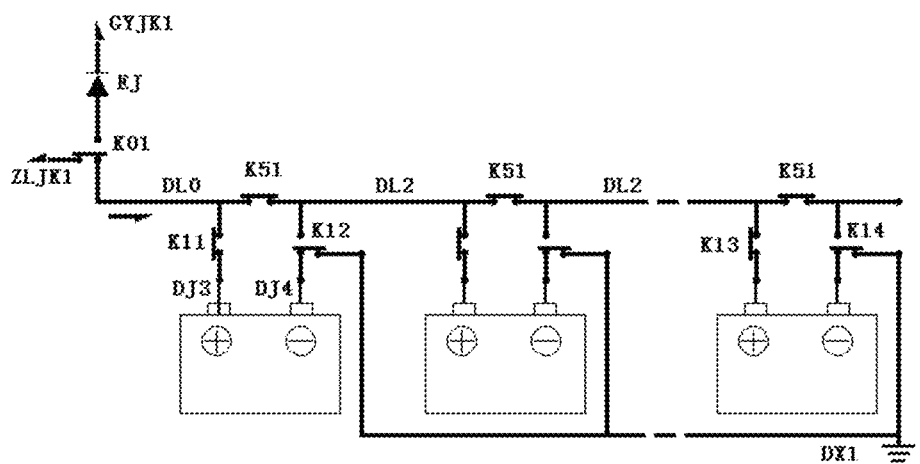
FIG. 7B shows the circuit in FIG. 7A, in which the first battery pack unit of the at least one boost station is charging on the boost side.

Further, as shown in FIG. 7B, the K51 is closed; the K12 and the K14 are respectively connected to the ground wire DX1; the switch K01 is connected to the DC interface ZLJK1; and each of the battery packs in the first battery pack unit 122 is connected in parallel for charging on the boost side.

After the charging on the buck station is completed, the second battery pack unit in the buck station 140 adopting the A-type ordinary battery packs forms a second series stack. There are three typical connection modes in the second series stack, including a single battery pack subunit, a parallel subunit (parallel combination of the battery packs) and a series subunit (battery packs connected in series), where the specific circuit diagram and implementation process are given as below.

Figure 8A:
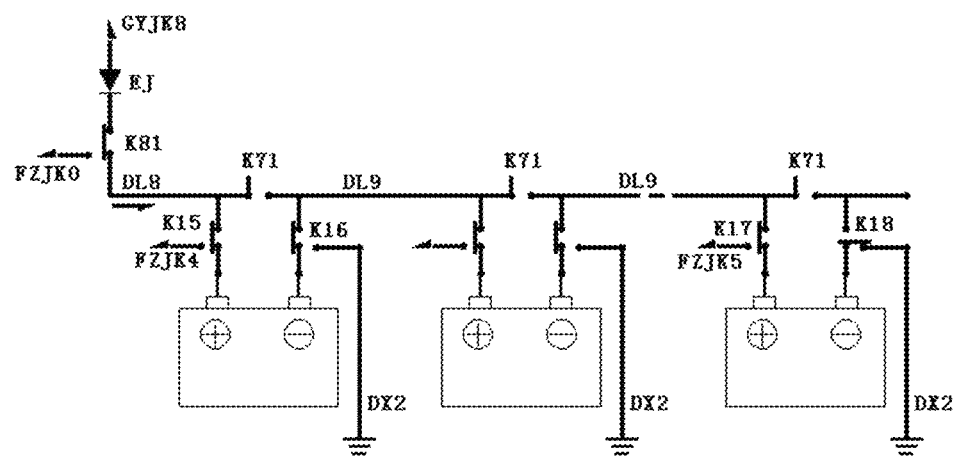
FIG. 8A shows a circuit according to an embodiment of the present disclosure, in which a second battery pack unit in a buck station adopting the A-type ordinary battery packs is charging on a buck side.
Figure 8B:
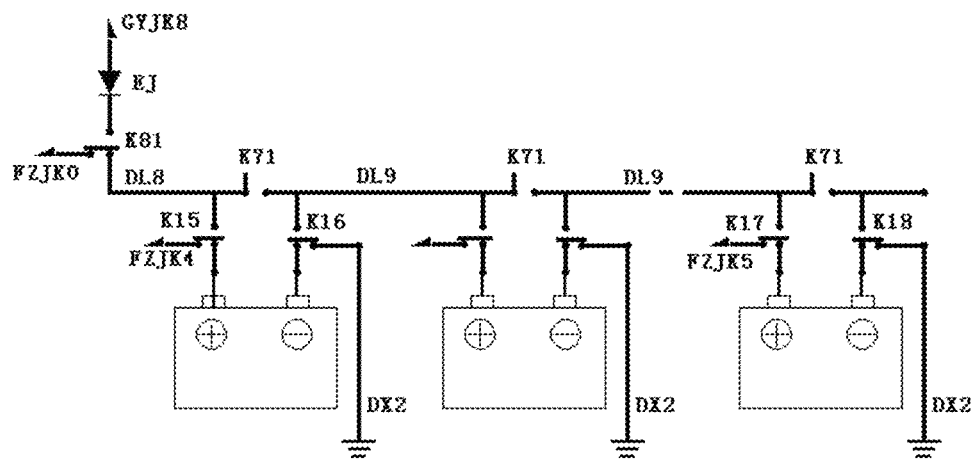
FIG. 8B shows the circuit in FIG. 8A, in which the second battery pack unit forms a plurality of single battery pack subunits to supply power to their respective loads after the charging on the buck side is completed.

As shown in FIG. 8A, in the buck station 140, each of the A-type ordinary battery packs in the second battery pack unit 142 is connected in series to form the second series stack for charging; in which:

GYJK8: a high-voltage cable interface, connected to the high-voltage cable 130; DX2: a ground wire 2; EJ: a diode, provided between the second battery pack unit 142 and the high-voltage cable 130; K81: a switch 81, configured to connect with GYJK8; FZJK0: a load interface 0; FZJK4: a load interface 4; FZJK5: a load interface 5; K15: a switch 15, a single-pole double-throw switch configured to connect the positive electrode of the corresponding battery pack to the DL8; K16: a switch 16, a single-pole double-throw switch configured to connect the negative electrode of the corresponding battery pack to the DL9; K17: a switch 17, a single-pole double-throw switch configured to connect the positive electrode of the corresponding battery pack to the DL9; K18: a switch 18, a single-pole double-throw switch configured to connect the negative electrode of the corresponding battery pack to the DX2; K71: a switch 71, a single-pole double-throw switch in off; DL8 is a cable connecting the K81 to the corresponding battery pack; and DL9 is the cable for connecting the battery packs On the basis of FIG. 8A, the state of each of the switches is changed. As shown in FIG. 8B, in the buck station 140, after the second battery pack unit 142 is charged, the connection mode of each of the battery packs is changed, so that each of the battery packs become a single battery pack subunit and is used as a load power supply respectively; in which:

GYJK8: a high-voltage cable interface; EJ: a diode, provided between the second battery pack unit 142 and the high-voltage cable 130; K81: a switch 81, configured to disconnect the cable DL8 from the high-voltage cable interface, and connected the cable DL8 to the FZJK0; K15: a switch 15, configured to connect the positive electrode of the corresponding battery pack to the load interface 4; K16: a switch 16, configured to connect the negative electrode of the corresponding battery pack to the DX2; K17: a switch 17, configured to connect the positive electrode of the corresponding battery pack to the FZJK5; K18: a switch 18, configured to connect the negative electrode of the corresponding battery pack to the DX2; and K71: a switch 71, which is open.

Figure 9:
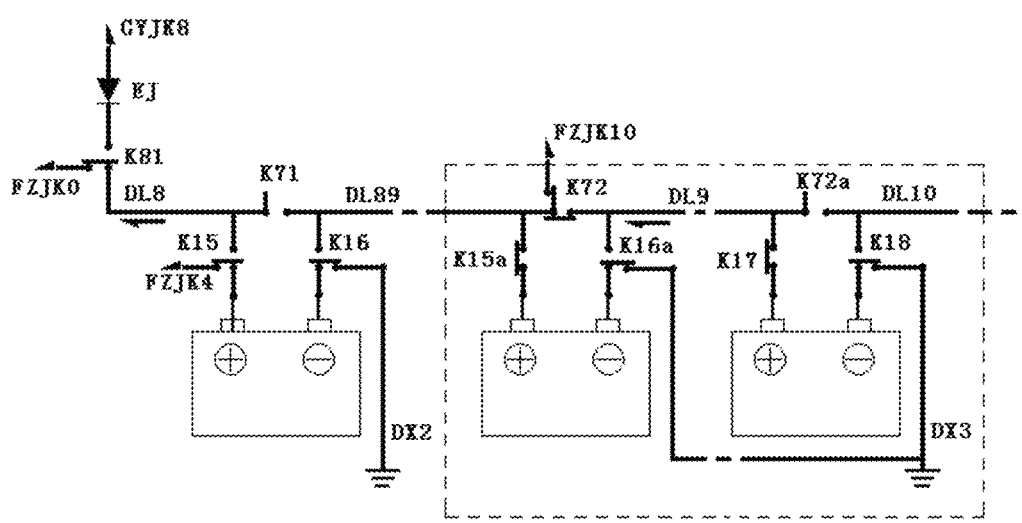
FIG. 9 shows a circuit according to an embodiment of the present disclosure, in which a part of the battery packs of the second battery pack unit in the at least one buck station are connected in parallel to serve as a parallel subunit to supply power to a load after the charging on the buck side is completed.

In an embodiment, as shown in FIG. 9, after the charging on the buck side is completed, a part of the battery packs are connected in parallel to form a parallel subunit to become a power supply for the loads.

In the drawing:

the battery pack unit adopts A-type ordinary battery packs; FZJK0: a load interface 0; FZJK4: a load interface 4; FZJK 10: a load interface 10; GYJK8: a high-voltage cable interface; EJ: a diode, provided between the second battery pack unit 142 and the high-voltage cable 130; K81: a switch 81, configured to disconnect the DL8 from the high-voltage cable interface, and connect the DL8 to the load interface FZJK0; DL8: a cable for connecting the switch 81 to the battery pack; DL89: a cable for connecting the corresponding battery pack to the parallel subunit (as shown in the dotted box in the drawing); DL9: a cable for connecting the battery packs in the parallel subunit; DL10: a cable for connecting the parallel subunit to the corresponding battery pack; K15: a switch 15, configured to connect the positive electrode of the corresponding battery pack to the load interface FZJK4; K16: a switch 16, configured to connect the negative electrode of the corresponding battery pack to the DX2; K15a: a switch 15a, configured to configured the positive electrode of the corresponding battery pack to the DL89 and switch 72; K16a: a switch 16a, configured to connect the negative electrode of the corresponding battery pack to the ground wire DX3; K17: a switch 17, configured to connect the positive electrode of the corresponding battery pack to the DL9; K18: a switch 18, configured to connect the negative electrode of the corresponding parallel subunit to the DX2; K71: a switch 71 which is turned on when the power is supplied; K72: a switch 72, a single-pole double-throw switch which is closed when the power is supplied to the loads; K72a: a switch 72a, which is turned off.

Figure 10A:
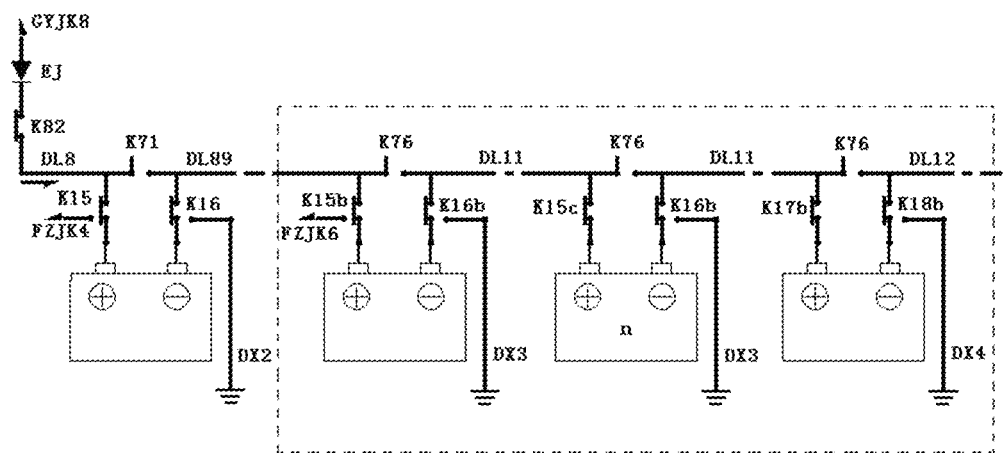
FIG. 10A shows a circuit according an embodiment of the present disclosure, in which the second battery pack unit in the at least one buck station adopting the A-type ordinary battery packs is charging on the buck side.

FIG. 10A shows a circuit according an embodiment of the present disclosure, in which the second battery pack unit 142 in the buck station adopting the A-type ordinary battery packs for charging on the buck side. Each of the battery packs in the second battery pack unit 142 is connected in series; in which:

DX2, DX3 and DX4: ground wires; FZJK4: a load interface 4; FZJK6: a load interface 6; DL8: a cable for connecting the switch 81 with the battery pack; DL89: a cable for connecting the corresponding battery pack to the series subunit (as shown in the dotted box in the drawing); DL11: a cable for connecting the battery packs in the series subunit; DL12: cable for connecting the series subunit and the corresponding battery pack; GYJK8: a high-voltage cable interface, configured to connect with the high-voltage cable; EJ: a diode, provided between the second battery pack unit 142 and the high-voltage cable 130; K82: a switch 82, configured to connect the DL8 to the GYJK8; K15: a switch 15, configured to connect the positive electrode of the corresponding battery pack to the DL8; K16: a switch 16, configured to connect the negative electrode of the corresponding battery pack to the DL89; K15b: a switch 15b, a single-pole double-throw switch configured to longitudinally connect the positive electrode of the series stack to the cable 89; K16b: a switch 16b, configured to connect the negative electrode of the corresponding battery pack to the DL11; K15c: a switch 15c, configured to connect the positive electrode of the corresponding battery pack to the DL11; K17b: a switch K17b, configured to connect the corresponding battery pack positive electrode to the DL11; K18b: switch 18b, which is configured to the negative electrode of the last battery pack in the series stack to the DL12; and the switches K71 and K76 respectively the switch, which are turned off when the series stack in the second battery pack unit is charging on the buck side.

Figure 10B:
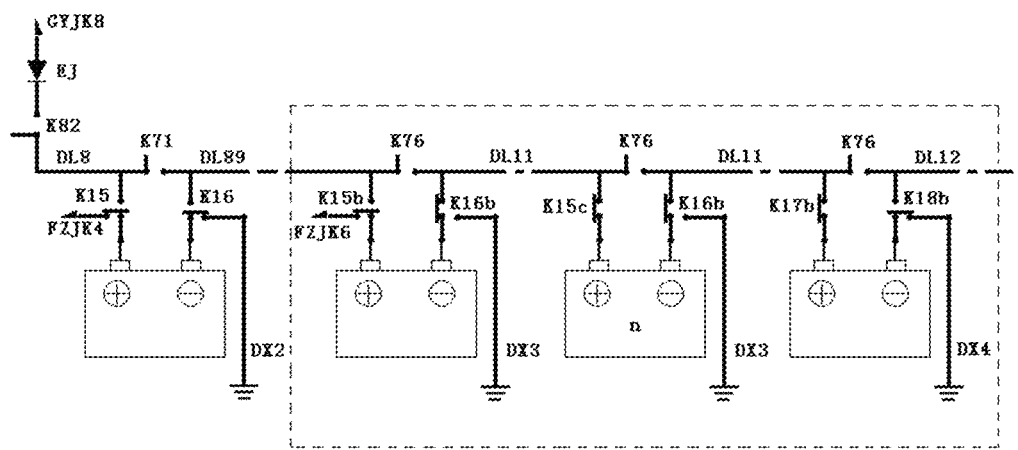
FIG. 10B shows the circuit in FIG. 10A, in which a part of battery packs of the second battery pack unit are connected in series to serve as a series subunit to supply power to a load after the charging on the buck side is completed.

In an embodiment, As shown in FIG. 10B, on the basis of FIG. 10A, after the charging on the buck side is completed, a part of the battery packs in the second battery pack unit 142 is connected in series to form a serial-connection subunit, where each of the battery packs in the dotted box is connected in series to become a series subunit to supply power to the corresponding load.

Figure 11:
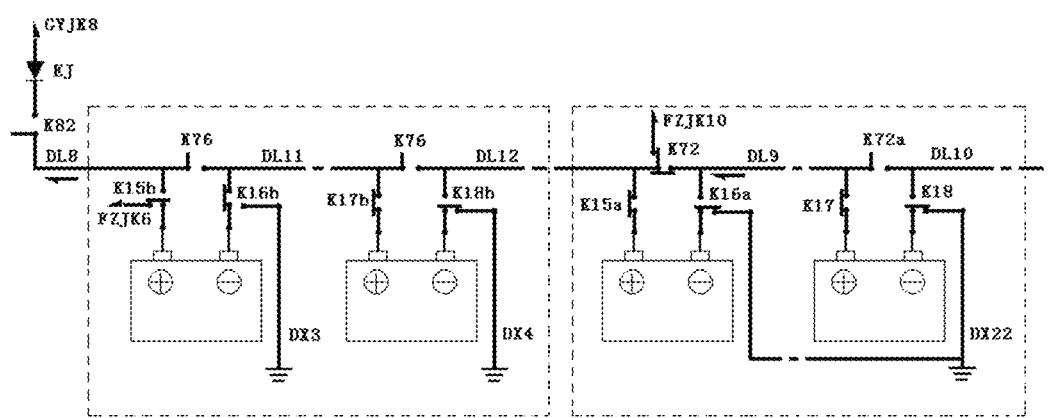
FIG. 11 shows a circuit according to an embodiment of the present disclosure, where the battery packs in the second battery pack unit simultaneously form a series subunit and a parallel subunit to supply power to their respective loads after the charging on the buck side is completed.

In an embodiment, as shown in FIG. 11, after the charging on the buck side is completed, a part of the battery packs in the second battery pack unit 142 is connected in series to form a series subunit (the first dotted box, as shown in the figures), and a part of the battery packs are connected in parallel to become a parallel subunit (as shown in the second dotted box in the drawing), where the series subunit and parallel subunit are configured to supply power to the corresponding loads.

In FIG. 11: DL8, DL9, DL10, DL11 and DL12: cables; DX3, DX4 and DX22: ground wires; GYJK8: a high-voltage cable interface; EJ: a diode, provided between the second battery pack unit 142 and the high-voltage cable 130; K82: a switch 82, configured to disconnect the DL8 from the GYJK8; FZJK6: a load interface 6; FZJK10: a load interface 10; K15b: a switch 15b, configured to connect the positive electrode of the series subunit to the FZJK6; K16b: a switch 16b, configured to connect the negative electrode of the corresponding battery pack to the DL11; K17b: a switch 17b, configured to connect the positive electrode of the corresponding battery pack to the DL11; K18b: a switch 18b, configured to connect the negative electrode of the battery pack in the series subunit to the DX4; K15a: a switch 15a, configured to connect the positive electrode of the corresponding battery pack to the switch 72; K16a: a switch 16a, configured to connect the negative electrode of the corresponding battery pack to the DX22; K17: a switch 17, configured to connect the positive electrode of the corresponding battery to the load interface 10 through the DL9; K18: a switch 18, configured to connect the negative electrode of the corresponding battery to the DX22; K72: a switch 72, connected to FZJK10, and is configured to connect the positive electrode of the parallel subunit through the DL12 and the DL9; and the switches K73 and K76 are turned off when the second battery pack unit supplies power to the corresponding loads.

In some embodiments, the second battery pack unit 142 in the buck station 140 adopts the B-type improved battery packs. After the charging on the buck side is completed, the second battery pack unit form three subunits with different typical connection modes, including a single battery pack subunit, a parallel subunit (parallel combination of the battery packs) and a series subunit (battery packs connected in series), where the specific circuit diagram and implementation process are given as below.

Figure 12A:
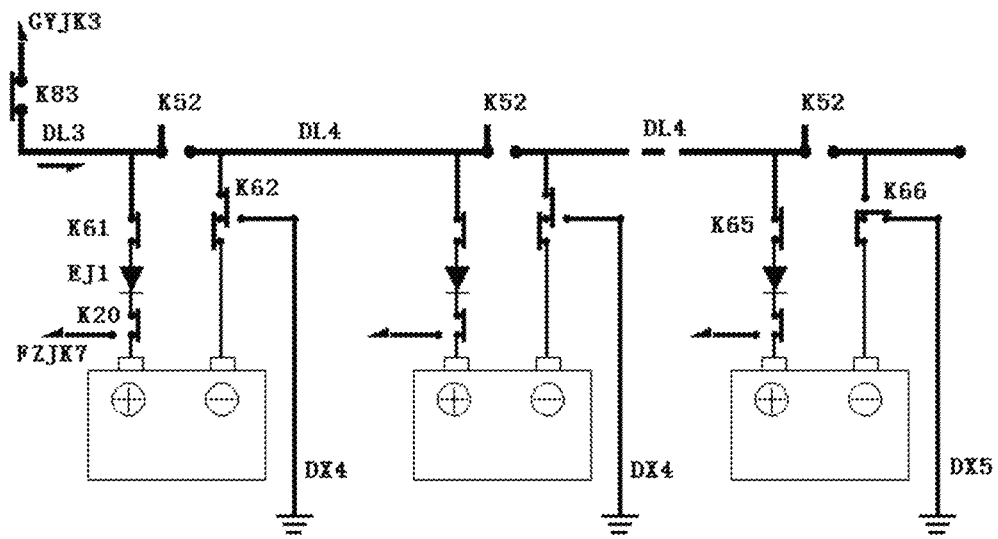
FIG. 12A shows a circuit according to an embodiment of the present disclosure, in which the second battery pack unit in the at least one buck station adopting the B-type improved battery pack is charging on the buck side.

In an embodiment, as shown in FIG. 12A, the second battery pack unit 142 in the buck station adopting the B-type improved battery pack is charging on the buck side. Each of the B-type improved battery packs are connected in series to form a second series stack.

In FIG. 12A:

DL3 and DL4: cables; DX4 and DX5: ground wires; GYJK3: a high-voltage cable interface, connected to the high-voltage cable 130; K83: a switch 83, configured to connect the DL3 to the GYJK3; FZJK7: a load interface 7; EJ1: a diode; K20: a switch 20, configured to connect the positive electrode of the corresponding battery pack to the EJ1; K61: a switch 61, configured to connect the EJ1 to the DL3; K62: a switch 62, a single-pole double-throw switch configured to connect the negative electrode of the corresponding battery pack to the DL4; K65: a switch 65, configured to connect the EJ1 to the DL4; K66: a switch 66, a single-pole double-throw switch configured to connect the negative electrode of the corresponding battery pack to the DX5; and the switch K52: a switch, which is in off.

Figure 12B:
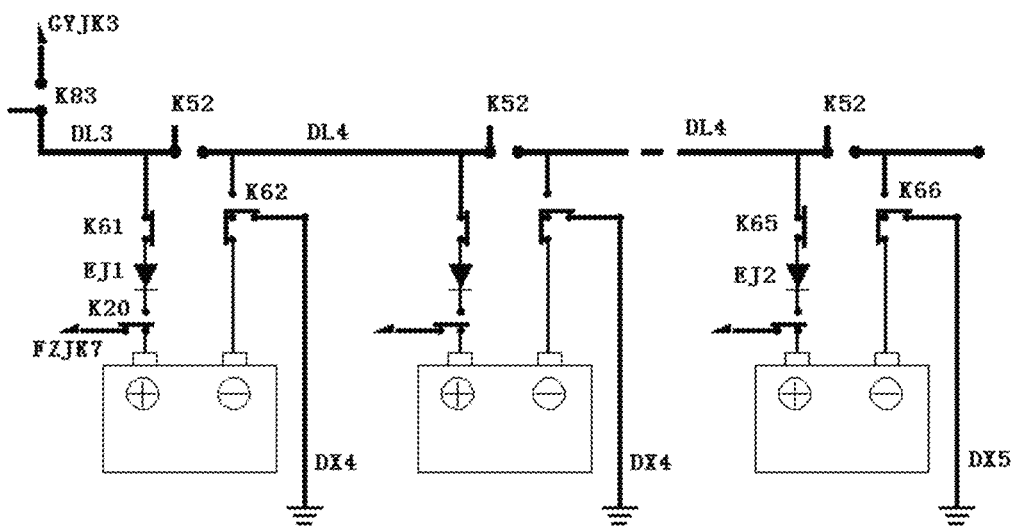
FIG. 12B shows the circuit in FIG. 11A, in which the second battery pack unit forms a plurality of single battery pack subunits to supply power to their respective loads after the charging on the buck side is completed.

Further, as shown in FIG. 12B, on the basis of FIG. 12A, after the charging of the buck side is completed, the K83 is turned off. By changing the state of the switches in the positive electrode and the negative electrode of each of the battery packs, each of the B-type improved battery packs becomes a single battery pack subunit to independently supply their own loads.

Figure 13A:
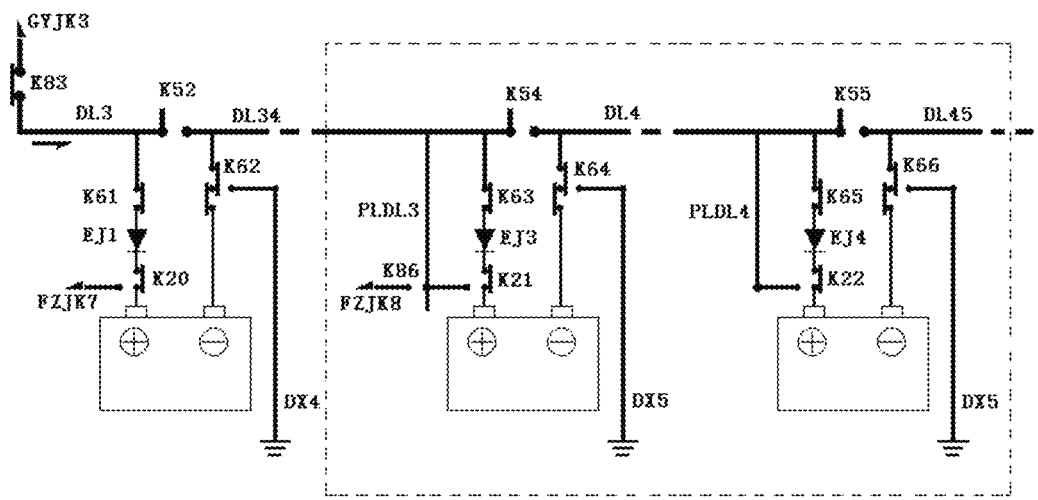
FIG. 13A shows a circuit according to an embodiment of the present disclosure, in which the second battery pack unit in the at least one buck station adopting the B-type improved battery pack is charging on the buck side.

In an embodiment, as shown in FIG. 13A, after the charging on the buck side is completed, a part of the battery packs in the second battery pack unit 142 is connected in parallel to form the parallel subunit, where each of the battery packs in the parallel subunit is provided with a bypass cable. The battery pack adopts a B-type improved battery pack. When each of the battery packs in the second battery pack unit 142 is charging on the buck side, the bypass cables (PLDL3 and PLDL4) are left floating.

In FIG. 13A:

DL3, DL34, DL4 and DL45: cables; FZJK7: a load interface 7; FZJK8: a load interface 8; EJ1, EJ3 and EJ4: diodes; GYJK3: a high-voltage cable interface, which is connected to the high-voltage cable 130; K83: a switch 83, a single-pole double-throw switch configured to connect the DL3 to the GYJK3; K20: a switch 20, configured to connect the positive electrode of the corresponding battery pack to the EJ1; K61: a switch 61, configured to connect the EJ1 to the DL3; K62: a switch 62, configured to connect the negative electrode of the corresponding battery pack to the DL34; K21: a switch 21, a single-pole double-throw switch configured to connect the positive electrode of the first battery pack in the parallel subunit to the EJ3; K63: a switch 63, a single-pole double-throw switch configured to connect the diode 3 on the positive electrode of the first battery pack unit in the parallel subunit to the DL34; K4: a switch 64, a single-pole double-throw switch configured to connect the negative electrode of the first battery pack in the parallel subunit to the DL4; K22: a switch 22, a single-pole double-throw switch configured to connect the positive electrode of the last battery pack in the parallel subunit to the EJ4; K65: a switch 65, configured to connect the EJ4 to the DL4; K66: a switch 66, configured to connect the negative electrode of the last battery pack in the parallel subunit to the DL45; K86: a switch 86, a single-pole double-throw switch configured to disconnect the PLDL3 from the FZJK8; K52: a switch 52, which is turned off when the battery packs are charging; K54: a switch 54, a single-pole double-throw switch which is disconnected during the charging on the buck side; K55: a switch 55, a single-pole double-throw switch which is turned off during the charging on the buck side; PLDL3: a bypass cable 3, where one end of the PLDL3 is connected to the DL34, the other end of the PLDL3 is connected to the switch K21 through the switch K86; and PLDL4: a bypass cable 4, one end of the PLDL4 is connected to DL4, and the other end of the PLDL4 is connected to the switch K22.

Figure 13B:
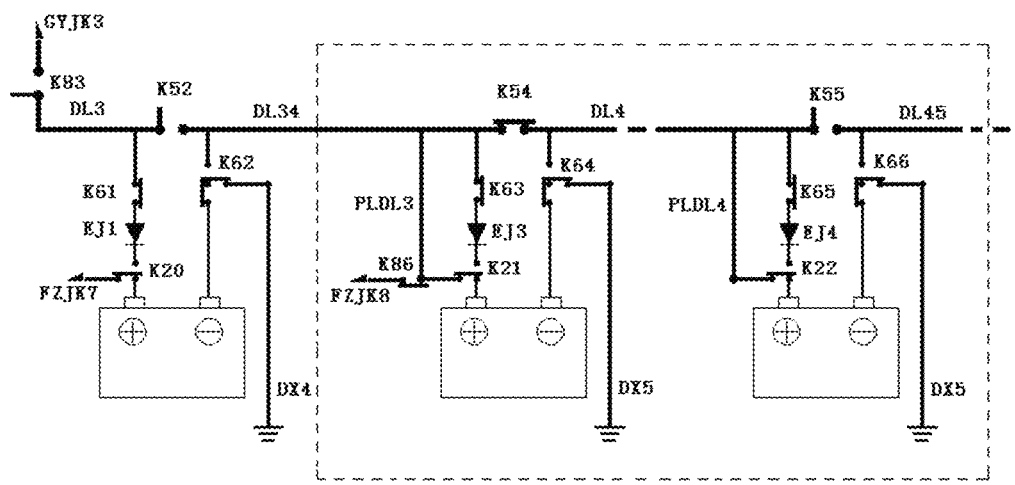
FIG. 13B shows the circuit in FIG. 13A, in which a part of the second battery pack unit forms a parallel subunit to supply power to a load after the charging on the buck side is completed.

As shown in FIG. 13B, after the charging of the second series stack formed by the battery packs in the second battery pack unit 142 is completed, one end of the PLDL3 is connected to the DL34, and the other end of the PLDL3 is connected to the switch K21 via the switch K86; one end of the PLDL4 is connected to DL4 and the other end of the PLDL4 is connected to the switch K22.

In an embodiment, after the charging on the buck side is completed, a part of the battery packs in the second battery pack unit 142 are connected in series to form a series subunit. The bypass cable in the first battery pack in the series subunit can be omitted.

Figure 14A:
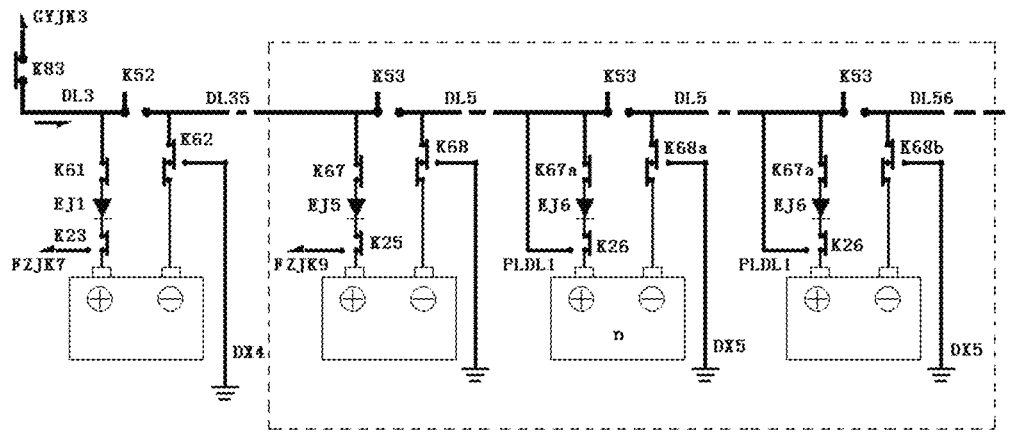
FIG. 14A shows a circuit according to an embodiment of the present disclosure, in which the second battery pack unit in the at least one buck station adopting the B-type improved battery pack is charging on the buck side.

As shown in FIG. 14A, the second series stack formed by the battery packs in the second battery pack unit 142 is charging on the buck side.

In FIG. 14A:

GYJK3: a high-voltage cable interface 3, which is connected to the high-voltage cable 130; DL3, DL35, DL5 and DL56: cables; FZJK7: a load interface 7; FZJK9: a load interface 9; K83: a switch 83, a single-pole double-throw switch configured to connect the DL3 to the GYJK3; PLDL1: a bypass cable 1, where one end of the PLDL1 is connected to the DL4, and the other end of the PLDL1 is connected to the K26; EJ1, EJ5 and EJ6: a diodes; K23: a switch 23, a single-pole double-throw switch configured to connect to the EJ1; K61: a switch 61, a single-pole double-throw switch configured to connect the EJ1 to the DL3, and the DL3 is connected to the GYJK3 via the K83; K62: a switch 62, a single-pole double-throw switch configured to connect the negative electrode of the corresponding battery pack to the DL35; K25: a switch 25, a single-pole double-throw switch configured to connect the positive electrode of the first battery pack in the series subunit to the EJ5; K67: a switch 67, a single-pole double-throw switch configured to connect the EJ5 to the DL35; K68: a switch 68, a single-pole double-throw switch configured to connect the negative electrode of the first battery in the series subunit to the DL5; K26: a switch 26, a single-pole double-throw switch configured to connect the positive electrode of the last battery pack in the series subunit to the EJ6; K67a: a switch 67a, a single-pole double-throw switch configured to connect the EJ6 and the DL5; K68a: a switch 68a, a single-pole double-throw switch configured to connect the negative electrode of the corresponding battery pack to the DL5; K68b: a switch 68b, a single-pole double-throw switch configured to connect the negative electrode of the last battery pack in the series subunit to the DL56; K52: a switch 52, a single-pole double-throw switch which is turned off during the charging on the buck side; and K53: a switch 53, a single-pole double-throw switch which is turned off during the charging on the buck side.

Figure 14B:
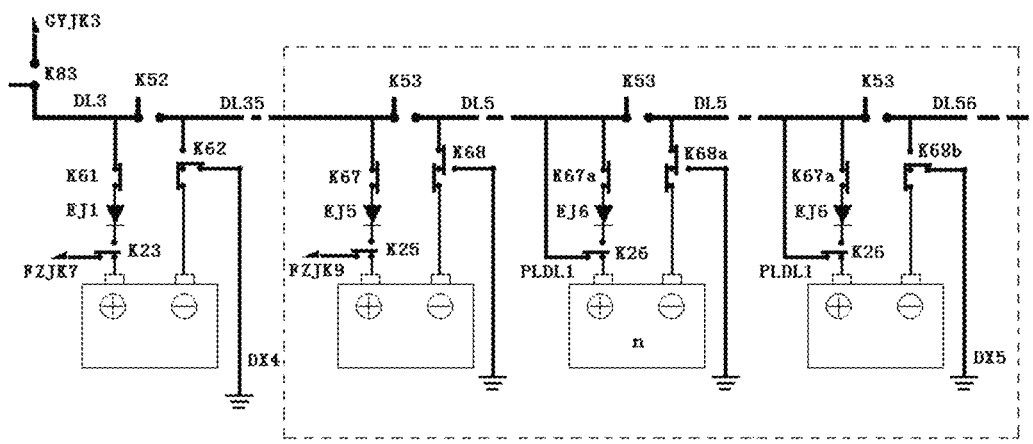
FIG. 14B shows the circuit in FIG. 14A, in which a part of the second battery pack unit forms a series subunit to supply power to a load after the charging on the buck side is completed.

Further, as shown in FIG. 14B, on the basis of FIG. 14A, after the charging on the buck side is completed, a part of the battery packs (each of the battery packs in the dotted box) are connected in series to form a series subunit, which is configured as a load power supply to supply power to the corresponding load.

In the full DC buck-boost power transmission system 100 of the present disclosure, after the charging on the buck side is completed, a part of the battery packs in the second battery pack unit 142 can be connected in series to form a series subunit, and the other part of the battery packs are connected in parallel to form a parallel subunit, and then the series subunit and the parallel subunit respectively supply power to their corresponding loads.

Figure 15A:
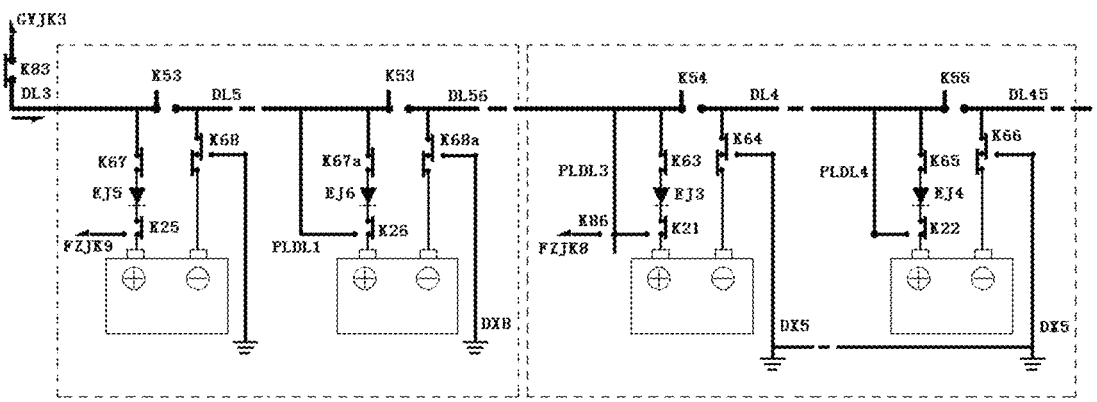
FIG. 15A shows a circuit according to an embodiment of the present disclosure, in which the second battery pack unit in the at least one buck station adopting the B-type improved battery pack is charging on the buck side.
Figure 15B:
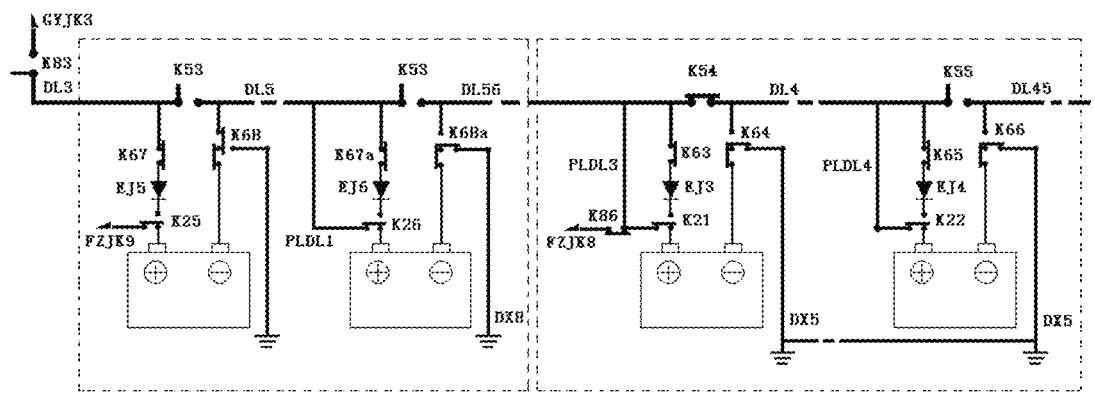
FIG. 15B shows the circuit of FIG. 15A, in which the second battery pack unit forms a series subunit and a parallel subunit to supply power to their respective load after the charging on the buck side is completed.

In an embodiment, as shown in FIG. 15A, the second series stack formed by the battery packs in the second battery pack unit 142 is charging on the buck side. Further, as shown in FIG. 15B, on the basis of FIG. 15A, a part of the battery packs in the second battery pack unit 142 are connected in series to form a series subunit (the first dotted box in FIG. 15B), the other part of the battery packs are connected in parallel to form a parallel subunit (the second dotted box in FIG. 15B), and then the series subunit and the parallel subunit respectively supply power to their corresponding loads.

In FIG. 15A:

GYJK3: a high-voltage cable interface 3, which is connected to the high-voltage cable 130; DX8 and DX5: ground wires; DL3, DL4, DL5, DL45 and DL56: cables; K83: a switch 83, configured to connect the DL3 and the GYJK3; FZJK9: a load interface 9; FZJK8: a load interface 8; PLDL1: a bypass cable 1, connected to the DL5; K25: a switch 25, configured to connect the positive electrode of the first battery pack in the second series stack to the EJ5; K67: a switch 67, configured to connect the EJ5 to the DL3; K68: a switch 68, configured to connect the negative electrode of the first battery pack in the series subunit to the DL5; K26: a switch 26, configured to connect the positive electrode of the battery pack in the series subunit to the EJ6; K67a: a switch 67a, configured to connect the EJ6 to the DL5; K68a: a switch 68a, configured to connect the negative electrode of the last battery pack in the series subunit to the DL56; K53: a switch 53, which is turned off during the charging on the buck side; PLDL3: a bypass cable 3, connected to the DL56; PLDL4: a bypass cable 4, connected to DL4; K21: a switch 21, a single-pole double-throw switch configured to connect the positive electrode of the first battery pack in the parallel subunit to the EJ3; K63: a switch 63, a single-pole double-throw switch configured to connect the EJ3 on the positive electrode of the first battery pack in the parallel subunit to the DL56; K64: a switch 64, a single-pole double throw configured to connect the negative electrode of the first battery pack in the parallel subunit to the DL4; K86: a switch 86, a single-pole double-throw switch configured to disconnect the PLDL3 from the FZJK8; K22: a switch 22, a single-pole double-throw switch configured to connect the positive electrode of the last battery pack in the parallel subunit to the EJ4; K65: a switch 65, configured to connect the EJ4 to the DL4; K66: a switch 66, configured to connect the negative electrode of the last battery pack in the parallel subunit to the DL45; K54 and K55: a switches, which are turned off during the charging on the buck side.

In some embodiments, the battery packs in the buck station 140 adopts the C-type improved battery packs. After the charging on the buck side is completed, the second battery pack unit form three subunits with different typical connection mode,s including a single battery pack subunit, a parallel subunit (parallel combination of the battery packs) and a series subunit (battery packs connected in series), where the specific embodiment is described in detail as follows.

Figure 16A:
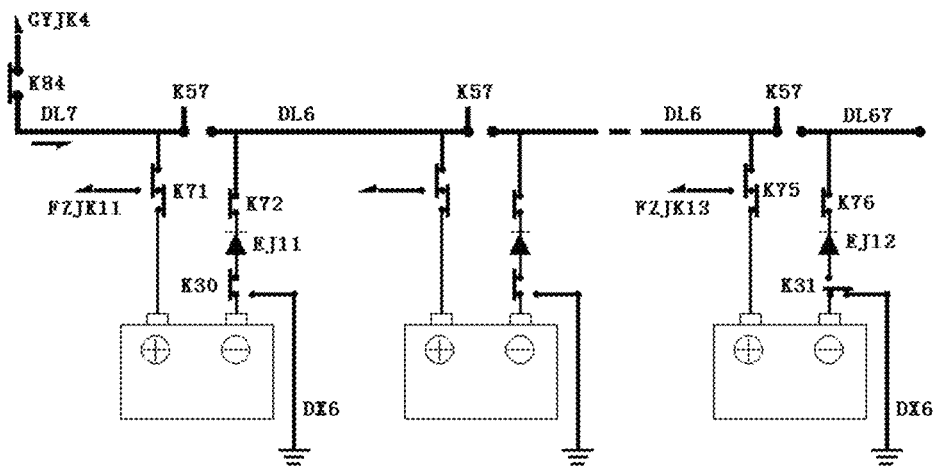
FIG. 16A shows a circuit according to an embodiment of the present disclosure, in which the second battery pack unit in the at least one buck station adopting the C-type improved battery pack is charging on the buck side.
Figure 16B:
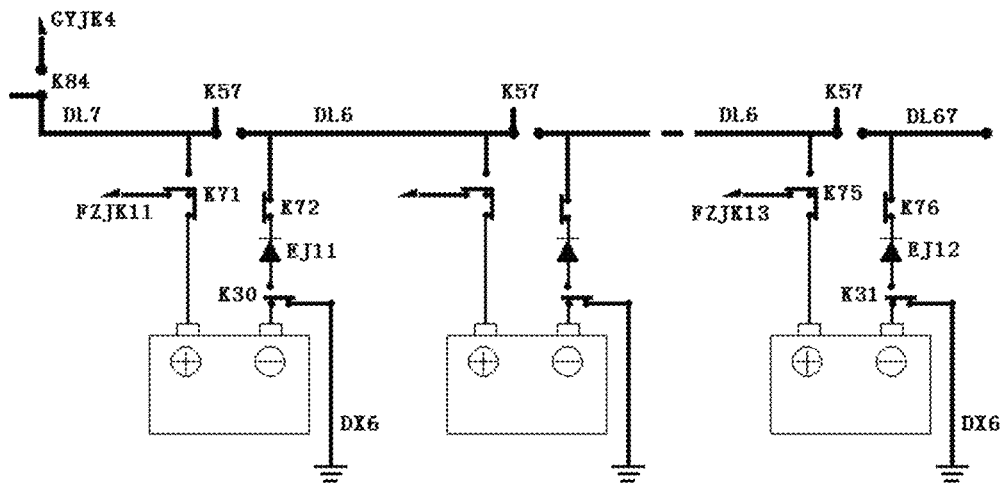
FIG. 16B shows the circuit, in which the second battery pack unit in the at least one buck station adopting the C-type improved battery pack forms a plurality of single battery pack subunits to supply power to their respective loads after the charging on the buck side is completed.

In an embodiment, as shown in FIG. 16A, the second series stack formed by the battery packs of the second battery pack unit in the buck station is charging on the buck side. As shown in FIG. 16B, after the charging on the buck side is completed, the state of the switches on the positive electrode and negative electrode of each of the battery packs are changed to obtain a plurality of single battery pack subunits, where each of the single battery pack subunits independently supply power to their corresponding loads.

In FIG. 16A:

the battery pack unit adopts C-type improved battery packs; GYJK4: a high-voltage cable interface 4, connected to the high-voltage cable 130; DX6: a ground wire; K84: a switch 84, a single-pole double-throw switch configured to connect the DL7 to the GYJK4; DL7, DL6 and DL67: cables; FZJK11: a load interface 11; FZJK13: a load interface 13; EJ11 and EJ12: diodes; K30: a switch 30, a single-pole double-throw switch configured to connect the negative electrode of the corresponding battery pack to the EJ11; K31: a switch 31, a single-pole double-throw switch configured to connect the negative electrode of the corresponding battery pack to the DX6; K71: a switch 71, a single-pole double-throw switch configured to connect the positive electrode of the corresponding battery pack to the DL7; K72: a switch 72, a single-pole double-throw switch configured to connect the EJ11 to the DL6; K75: a switch 75, a single-pole double-throw switch configured to connect the positive electrode of the corresponding battery pack to the DL6; K76: a switch 76, which is configured to connect the negative electrode EJ12 of the last battery pack to the DL67; and K57: a switch 57, a single-pole double-throw switch which is turned off during the charging on the buck side.

Figure 17A:
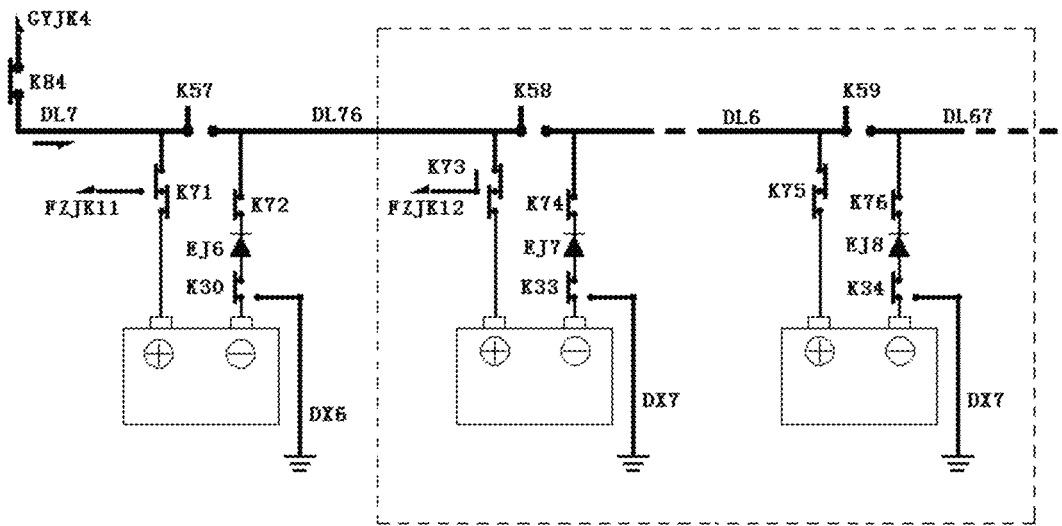
FIG. 17A shows a circuit according to an embodiment of the present disclosure, in which the second battery pack unit in the at least one buck station adopting the C-type improved battery pack is charging on the buck side.
Figure 17B:
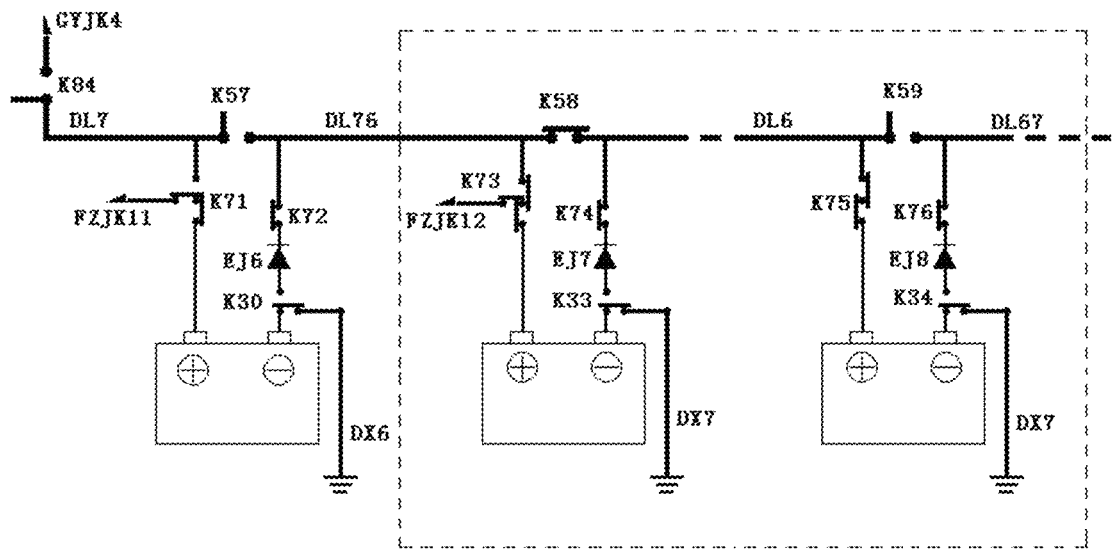
FIG. 17B shows the circuit in FIG. 17A, in which the second battery pack unit forms a single battery pack subunit and a parallel subunit to supply power to their respective loads after the charging on the buck side is completed.

In an embodiment, as shown in FIG. 17A, the second series stack formed by the battery packs on the second battery pack unit is charging on the buck side. As shown in FIG. 17B, after the charging on the buck side is completed, the state of the switches on the positive electrode and negative electrode of each of the battery packs are changed to obtain a single battery pack subunit and a parallel subunit (as shown in the dotted box in FIG. 17B), where the single battery pack subunit and the parallel subunit are independently supply power to their corresponding loads.

In FIG. 17A:

GYJK4: a high-voltage cable interface 4, connected to the high-voltage cable 130; DX6 and DX7: ground wires; K84: a switch 84, configured to connect the DL5 to the GYJK4; DL7, DL76, DL6 and DL67: cables; FZJK11: a load interface 11; FZJK12: a load interface 12; EJ6: a diode 6; EJ7: a diode 7; EJ8: a diode 8; K30: a switch 30, a single-pole double-throw switch configured to connect the negative electrode of the corresponding battery pack to the EJ7; K34: a switch 34, a single-pole double-throw switch configured to connect the negative electrode of the corresponding battery pack to the EJ8; K71: a switch 71, a single-pole double-throw switch configured to connect the positive electrode of the corresponding battery pack to the DL7; K72: a switch 72, a single-pole double-throw switch configured to connect the EJ6 to the DL6; K73: a switch 73 configured to connect the positive electrode of the corresponding battery pack to the DL6; K74: a switch 74, a single-pole double-throw switch configured to connect the negative electrode of the corresponding battery pack to the DL6; K75: a switch 75, a single-pole double-throw switch configured to connect the positive electrode of the corresponding battery pack to the DL6; K76: a switch 76, configured to connect the negative electrode EJ8 of the last battery pack to the DL67; K57: a switch 57, a single-pole double-throw switch which is turned off during the charging on the buck side; K58: a switch 58, a single-pole double-throw switch which is turned off during the charging on the buck side; K59: a switch 59, a single-pole double-throw switch which is turned off during the charging on the buck side.

Figure 18A:
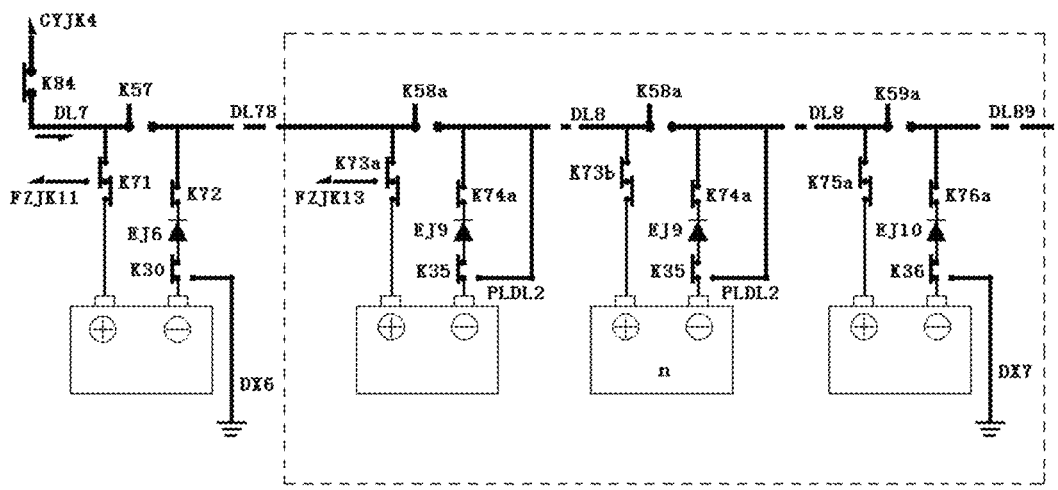
FIG. 18A shows a circuit according to an embodiment of the present disclosure, in which the second battery pack unit in the at least one buck station adopting the C-type improved battery pack is charging on the buck side.
Figure 18B:
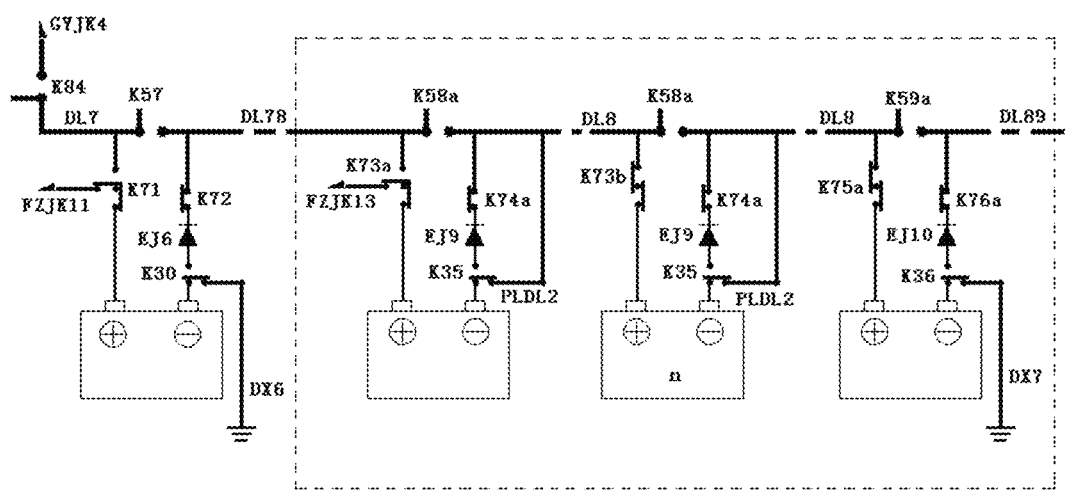
FIG. 18B shows the circuit in FIG. 18A, in which the second battery pack unit forms a single battery pack subunit and a series subunit to supply power to their respective loads after the charging on the buck side is completed.

In an embodiment, as shown in FIG. 18A, the second series stack formed by the battery packs on the second battery pack is charging on the buck side, where the battery packs adopt C-type improved battery packs. As shown in FIG. 18B, after the charging on the buck side is completed, the state of each of the switches on the positive electrode and negative electrode of each of the battery packs is changed to obtain a single battery pack subunit and a series subunit (as shown in the dotted box in FIG. 18B), where the single battery pack subunit and the series subunit are independently supply power to their corresponding loads.

In FIG. 18A:

GYJK4: a high-voltage cable interface 4, connected to the high-voltage cable 130; DX6 and DX7: ground wires; K84: a switch 84, configured to connect the DL7 to the GYJK4; DL7, DL78, DL8 and DL89: cables; PLDL2: a bypass cable 2, connected to the DL8; FZJK11: a load interface 11; FZJK13: a load interface 13; EJ6: a diode 6; EJ9: a diode 9; EJ10: a diode 10; K30: a switch 30, a single-pole double-throw switch configured to connect the negative electrode of the corresponding battery pack to the EJ6; K35: a switch 35, a single-pole double-throw switch configured to connect the negative electrode of the corresponding battery pack to the EJ9; K36: a switch 36, a single-pole double-throw switch configured to connect the negative electrode of the corresponding battery pack to the EJ10; K71: a switch 71, a single-pole double-throw switch configured to connect the positive electrode of the corresponding battery pack to the DL7; K72: a switch 72 a single-pole double-throw switch configured to connect the EJ6 to the DL6; K73a: a switch 73a configured to connect the positive electrode of the corresponding battery pack to the DL78; K74a: a switch 74a, a single-pole double-throw switch configured to connect the negative electrode EJ9 of the corresponding battery pack to the DL8; K75a: a switch 75a, a single-pole double-throw switch configured to connect the positive electrode of the last battery pack to the DL8; K76a: a switch 76a, a single-pole double-throw switch configured to connect the EJ10 at the negative electrode of the last battery pack in the series subunit to the DL89; K57: a switch 57, which is turned off during the charging on the buck side; K58a: a switch 58a, which is turned off during the charging on the buck side;

K59a: a switch 59a, which is turned off during the charging on the buck side; n: the number of the battery packs in the second battery pack.

Figure 19A:
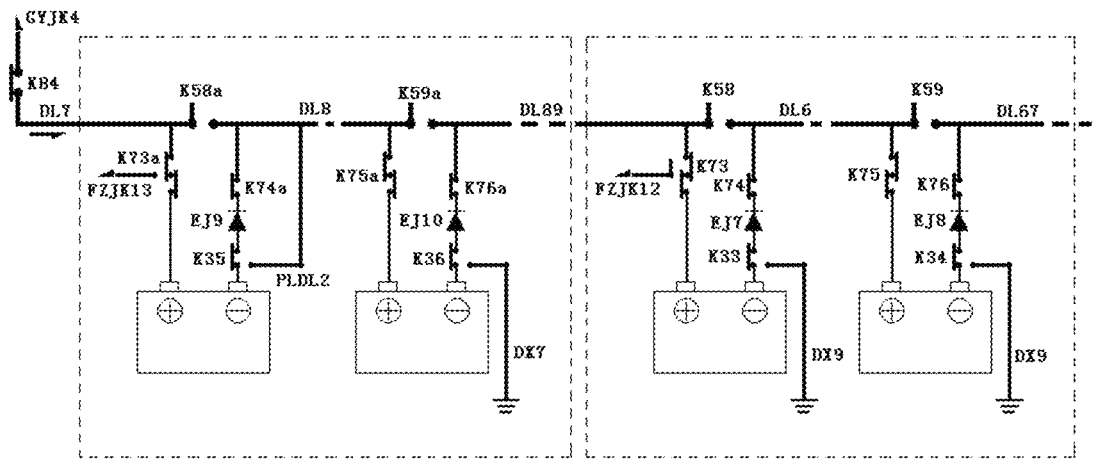
FIG. 19A shows a circuit according to an embodiment of the present disclosure, in which the second battery pack unit in the at least one buck station adopting the C-type improved battery pack is charging on the buck side.
Figure 19B:
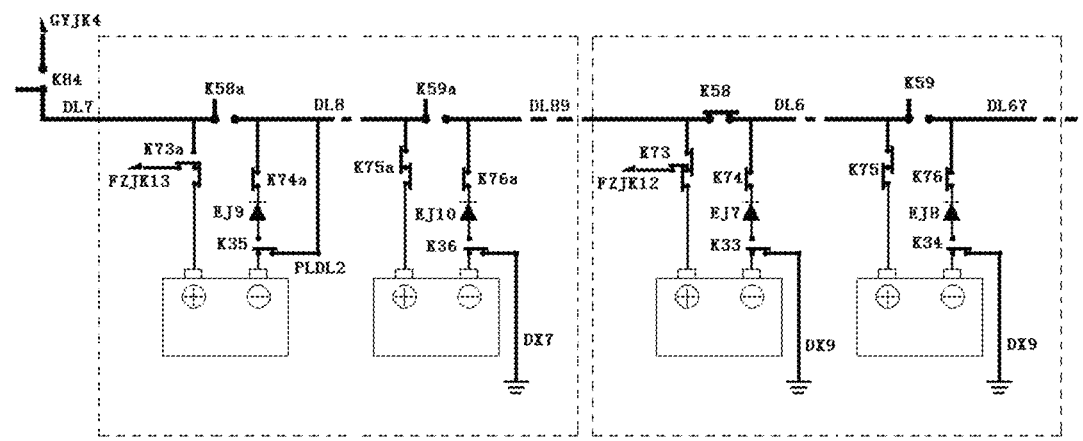
FIG. 19B shows the circuit in FIG. 19A, in which the second battery pack unit forms a parallel subunit and a series subunit to supply power to their respective loads after the charging on the buck side is completed.

In an embodiment, as shown in FIG. 19A, the second series stack formed by the battery packs on the second battery pack is charging on the buck side. As shown in FIG. 5-4B, after the charging on the buck side is completed, the state of each of the switches on the positive electrode and negative electrode of each of the battery packs is changed to obtain a series subunit (the first dotted box in FIG. 19B) and a parallel subunit (the second dotted box in FIG. 19B), and then the series subunit and the parallel subunit are independently supply power to their corresponding loads.

In FIG. 19A:

GYJK4: a high-voltage cable interface 4, connected to the high-voltage cable 130; K84: a switch 84, configured to connect the cable 7 to the GYJK4; DL7, DL8 and DL89: cables; PLDL2: a bypass cable 2, connected to the DL8; FZJK13: a load interface 13; EJ9: a diode 9; EJ10: a diode 10; K35: a switch 35, a single-pole double-throw switch configured to connect the negative electrode of the first battery pack in the corresponding battery stack to the EJ9; K36: a switch 36, a single-pole double-throw switch configured to connect the negative electrode of the last battery pack in the series subunit to the EJ10; K73a: a switch 73a, a single-pole double-throw switch configured to connect the positive electrode of the first battery pack in the series subunit to the DL7; K74a: a switch 74a, a single-pole double-throw switch configured to connect the negative electrode EJ9 of the first battery pack in the series connection subunit to the DL8; K75a: a switch 75a, a single-pole double-throw switch configured to connect the positive electrode of the last battery pack in the series subunit to the DL8; K76a: a switch 76a, a single-pole double-throw switch configured to connect the negative electrode EJ10 of the last battery pack in the series subunit to the DL89; K58a: a switch 58a, which is turned off during the charging on the buck side; K59a: a switch 59a, which is turned off during the charging on the buck side; DX7: a ground wire 7.

In the circuit diagram shown in the second dotted box in FIG. 19A, DL6 and DL67: cables; FZJK12: a load interface 12; EJ7 and EJ8: diodes; K33: a switch 33, a single-pole double-throw switch configured to connect the negative electrode of the corresponding battery pack to the EJ7; K34: a switch 34, a single-pole double-throw switch configured to connect the negative electrode of the corresponding battery pack to the EJ8; K73: a switch 73, configured to connect the positive electrode of the corresponding battery pack to the DL89; K74: a switch 74, a single-pole double-throw switch configured to connect the negative electrode EJ7 of the corresponding battery pack to the DL6; K75: a switch 75, a single-pole double-throw switch configured to connect the positive electrode of the corresponding battery pack to the DL6; K76: a switch 76, a single-pole double-throw switch configured to connect the negative electrode EJ8 of the last battery pack in the parallel subunit to the cable 67; K58: a switch 58, a single-pole double-throw switch which is turned off during the charging on the buck side; K59: a switch 59, a single-pole double-throw switch which is s turned off during the charging on the buck side; DX9: a ground wire 9.

It should be noted that, regardless of whether the above-mentioned second battery pack unit 142 adopts the A-type ordinary battery pack, the B-type improved battery pack or the C-type improved battery pack, after the charging on the buck-side is completed, the battery packs in the second battery pack unit can be moved away from the installation positions to supply power to the loads, or supply power to the loads without being moved away from the installation positions.

In an embodiment, the full DC buck-boost power transmission system 100 may include a plurality of boost stations 120 and a plurality of buck stations 140 to form a full DC high-voltage transmission and transformation power grid, where the boost station includes a plurality of boost substations; and the buck station includes a plurality of buck substations.

Specifically, the DC power supply 110 for maintaining the power grid on the primary side is not directly connected to the power grid through the high-voltage cable 130. Therefore, the full DC buck-boost power transmission system 100 can accept the power feed with different types and different power generation amounts from the DC power supply 110 on the primary side, where the power feed includes tolerance intermittent power generation and random power generation.

The load and the secondary power grid are not directly connected to the power grid through the high-voltage cable 130, so that their working status are not influenced by the operation of the power grid.

In order to ensure that the DC power supply 110 on the primary side continuously supplies power to the open full DC high voltage transmission and distribution power grid, the boost station 120 should provide with two or more sets of the first battery pack unit 122 for receiving the power input from the DC power supply 110 on the primary side in turn. Similarly, in order to ensure that the buck station 140 continuously supplies power to the loads, two or more sets of the second battery pack units 142 should be provided.

It should be noted that, if the DC power supply 110 on the primary side generates power intermittently or randomly, different measurement should be implemented according to the charging condition of the first battery pack unit 122:

(1) if the first battery pack unit 122 is fully charged, the charging is stopped and the first battery pack unit 122 is connected to the power grid through the high-voltage cable 130; if the DC power source 110 is still supplying power, it charges another (or standby) first battery pack unit 122.

(2) If the DC power supply 110 has stopped supplying power but the first battery pack unit 122 is not fully charged, the first battery pack unit 122 continues to be charged for the next time the DC power supply 110 supply power; or, if the first battery pack unit 122 without being fully charged has reached the voltage standard required by the power grid, it can also be connected to the power grid without being charged for the next time.

Figure 20A:
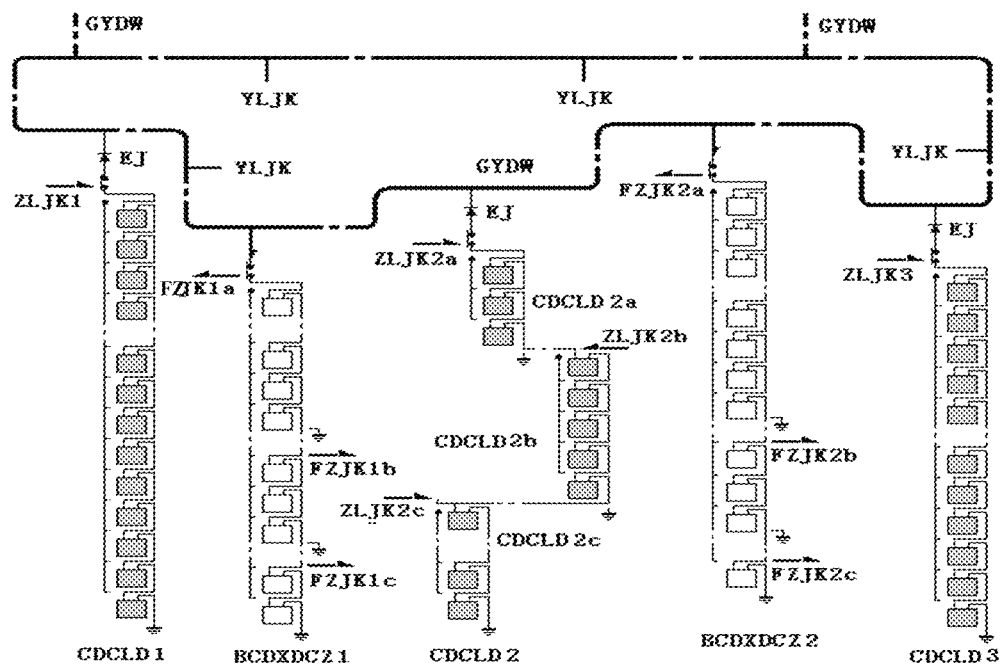
FIGS. 20A-B are circuit diagrams of a full DC high voltage transmission and distribution power grid in different working states according to an embodiment of the present disclosure.

The full DC high-voltage transmission and transformation power grid can be constructed by using the above-mentioned full DC buck-boost power transmission system 100. FIG. 20A shows a circuit of the full DC high-voltage transmission and distribution power grid in a working state according to an embodiment of the present disclosure.

In the drawing:

GYDW: a high-voltage power grid; CDCLD1: a first series stack 122-1 in the first battery pack unit 122, consisting of A-type ordinary type battery packs, where the fully charged battery packs in the drawing are filled with gray to distinguish; EJ: a diode; the EJ are connected to the GYDW to send power; the cable in dashed line in the drawing intends to show the cable in a simplified and illustrative manner; ZLJK1: a DC interface 1, which is provided for the first series stack 122-1; CDCLD2: a second series stack 122-2 of the first battery pack unit, which is composed of the A-type ordinary battery pack, where the fully charged battery packs in the drawing are filled with gray to distinguish; the EJ is connected to the GYDW send power; the second series stack 122-2 in the first battery pack unit is composed of a plurality of series sub-stacks, including CDCLD2a, CDCLD2b, and CDCLD2c, where the series sub-stacks may not be arranged in the same place, and there is a certain distance from each other; the cable in dashed line in the drawing intends to show the cable in a simplified and illustrative manner. ZLJK2a: a DC interface 2a, which is provided for the CDCLD2a; ZLJK2b: a DC interface 2b, provided for the CDCLD2b; ZLJK2c: a DC interface 2c, provided for the CDCLD2; CDCLD3: a third series stack 122-3 in the first battery pack, consisting of A-type ordinary battery packs, and the battery packs thereof has been charged. The battery packs are connected to the power grid through the diode EJ to sent power to the power grid. The cable in dashed line in the drawing intends to show the cable in a simplified and illustrative manner. ZLJK3: a DC interface 3, provided for the third series stack 122-3 in the first battery pack unit.

In the buck station, BCDXDCZ1: a first buck station 142-1 of the second battery pack unit, consisting of B-type or C-type improved battery packs, and the corresponding battery packs are being charged. After the BCDXDCZ1 is fully charged, the connection mode of the battery packs can be changed to form a single battery pack subunit, a parallel subunit and a series subunit. the cable in dashed line in the drawing intends to show the cable in a simplified and illustrative manner; and the single battery pack subunit, the parallel subunit or the series subunit can be omitted in some embodiments. FZJK1a: a load interface 1a; FZJK1b: a load interface 1b; FZJK1c: a load interface 1c; where FZJK1a, FZJK1b and FZJK1c are respectively a load interface provided for the parallel combination of the battery packs to be charged or the series stack of the battery packs to be charged; BCDXDCZ2: a second subunit 142-2 of the second battery pack unit, which is composed of B-type or C-type improved battery packs. The battery packs to be charged are depicted as colorless in the drawing. The second buck station 142-2 of the second battery pack unit are separated to form a single battery pack subunit, a parallel subunit and a series subunit, and respectively supply power to their corresponding loads. The cable in dashed line in the drawing intends to show the cable in a simplified and illustrative manner. FZJK2a: a load interface 2a; FZJK2b: a load interface 2b; FZJK2c: a load interface 2c; the diode EJ is provided between the first battery pack unit 122 (including 122-1, 122-2 and 122-3) consisting of A-type ordinary battery packs and the power grid, to prevent current from the power grid flow to the first battery pack unit 122; YLJK: a reserved interface, which is configured to connect the other subunit 142-X of the second battery group unit that meets the technical indicators in the future to the power grid, thereby forming an open extended power grid which is capable of connecting the power grids in remote areas.

FIG. 20A shows the circuit of the full DC high voltage transmission and distribution power grid, in which the second battery pack unit 142 on the buck side is charging.

FIG. 20A shows a part of the entire full DC high voltage transmission and distribution power grid. In the boost station 120, the total nominal voltage of the battery packs in the series stacks 122-1, 122-2 and 122-3 of the first battery pack units connected in series should be within a range specified by the power grid, and should be within the same first preset standard voltage range. In the buck station 140, the total nominal voltage of the battery packs in the buck stations 142-1 and 142-2 of the second battery pack units should be within the range specified by the power grid, and should be within the same second preset standard voltage range. The power grid has the same access requirements for the boost station 120 and the buck station 140, so that any other boost station 120 or buck station 140 can be operated in a suitable voltage environment once connected to the grid. In the current situation, it is appropriate that the total nominal voltage of the boost station 120 network access standard is 20% higher than the total nominal voltage of the buck station 140 access network standard.

Figure 20B:
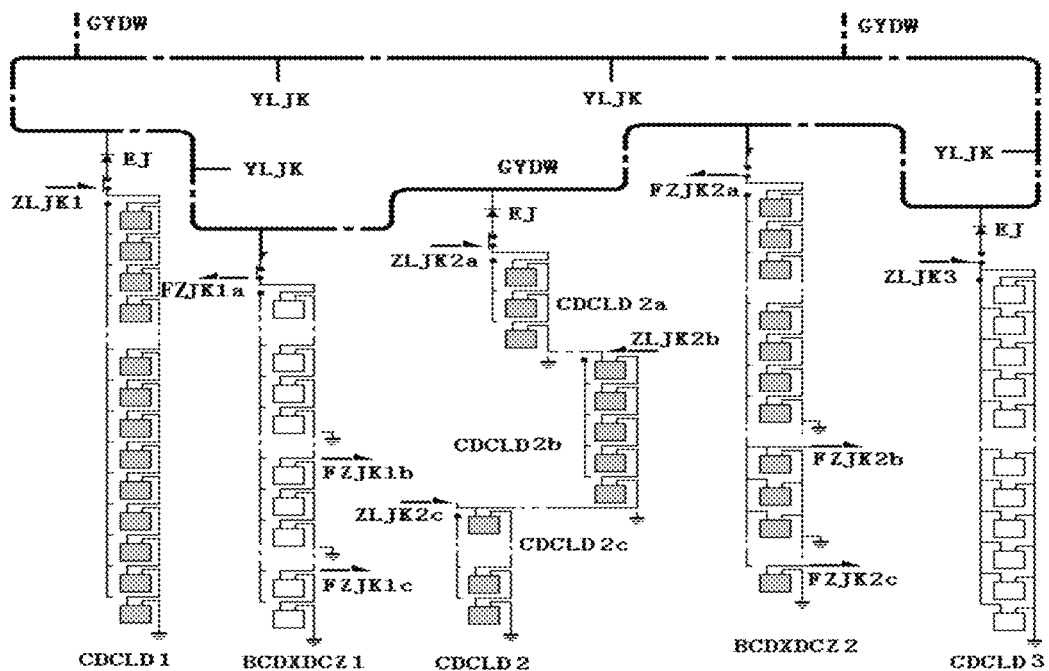

Further, as shown in FIG. 20B, CDCLD3 is disconnected from the power grid and connected to the ZLJK3, so that each of the battery packs in the CDCLD3 connected in parallel is to be charged on the boost side. After the charging on the BCDXDCZ2 is completed, the BCDXDCZ2 is disconnected from the power grid, and forms a single battery pack subunit, a parallel subunit and a series subunit. The single battery pack subunit, the parallel subunit and the series subunit are respectively connected to their own load interfaces and independently supply power to their loads; FZJK2a is connect to the serial-connected subunit; FZJK2b is connected to the parallel subunit; and FZJK2c is connected to the single battery pack subunit.

Both the first battery pack unit 122 and the second battery pack unit 142 have two working states of being charged and charging, but the periods of their working state are different. Therefore, there are many combinations of working conditions of the entire power grid, and the combinations of working conditions are constantly changing. Regardless of the working conditions, each of the boost stations 120 charges all the buck stations 140 connected to the power grid through the power grid. Since the first battery pack unit 122 and the second battery pack unit 142 are respectively connected to the power grid through a unidirectional conductive element, so that the boost station 120 will not be charged by the power grid at any time, and the buck station 140 will not charge other buck stations through the power grid. In actual use, the switching of the working conditions of each of the boost stations 120 and each of the buck station 140 should be controlled by a power grid management center. The smart grid technologies including hardware and software for overall management, control, adjustment, and detection are not elaborated herein.

Described below are preferred embodiments in practical application, which may be not the best design for the actual case, and the voltage drop of the transmission wire is omitted in the calculation process.

Embodiment 1

In this embodiment, the DC power supply 110 on the primary side adopts an isolated photovoltaic power plant having a power of 2.88 MW, an output voltage of 480 V, and an output current of 6000 A.

In the boost station 120, the battery packs in the first battery pack unit 122 are A-type ordinary battery packs with the same specification, where the nominal voltage of each of the battery packs≈480 V/1.2=400 V; the optimal charging current of each of the battery packs is 100 A; and the number of the battery packs is 60. Therefore, the sum of the optimal charging current of the first battery pack unit 122 is equal to 6000 A. According to FIG. 7B and its description, each of the A-type ordinary battery packs in the first battery pack unit 122 is connected in parallel, so that the DC power supply 110 on the primary side charges the first storage battery pack unit 122 at full capacity. When the incident light intensity is lower than the nominal light intensity, the battery packs in the boost station perform charging in turns. After the charging on the boost side is completed, with reference to FIG. 7A, the connection mode of each of the A-type ordinary battery packs in the first battery pack unit 122 is changed to a series connection to form a first series stack, so that the first series stack connects to the power grid via the diode to transmit electricity power, where the transmission voltage is 60×400 V=24 kV, and the transmission current is 100 A.

After the boost station 120 performs the power transmission process to the power grid (that is, the charging process on the buck side), with reference to FIG. 7B, the battery packs in the first storage battery pack unit 122 are connected, and the first battery pack unit 122 reconnects with the power supply 110 on the primary side for charging on the boost side.

In the buck station, all battery packs in the second battery pack unit 142 share the same specification, which can be any one of A-type ordinary battery packs, B-type improved battery packs, and C-type improved battery packs. The nominal voltage of each of the battery packs is 120 V; the optimal charging current of each of the battery packs is 99 A; and the optimal total charging voltage is 24 kV/1.2=20 kV. Therefore, the total number of the battery packs is 20 kV/0.12 kV=167, and their total nominal voltage is 167× 0.12 kV=20 kV. If the second battery pack unit 142 adopts the A-type ordinary battery packs, the charging on the buck side is performed, with reference to FIGS. 8A and 10A; if the second battery pack unit 142 adopts the B-type improved battery packs, the charging on the buck side is performed, with reference to FIGS. 12A and 14A; and if the second battery pack unit 142 adopts the C-type improved battery packs, the charging on the buck side is performed, with reference to FIGS. 16A and 18A. After the charging on the buck side is completed, the connection mode of each of the A-type ordinary battery packs in the second battery pack unit 142 is changed according to the user loads and the type of the battery pack. The second battery pack unit 142 can be configured as follows.

(1) A series subunit with 50 battery packs, in which a voltage of the series subunit is 6 kV, and the series subunit can send power to remote users. The A-type ordinary battery packs adopted by the series subunit are connected, with reference to FIG. 10B; the B-type improved battery packs adopted by the series subunit are connected, with reference to FIG. 14B; and the C-type improved battery packs adopted by the series subunit are connected, with reference to FIG. 18B.

(2) A series subunit with 20 battery packs, in which a voltage of the series subunit is 2.4 kV, and the series subunit can send power to users not far from the system. The A-type ordinary battery packs adopted by the series subunit are connected, with reference to FIG. 10B; the B-type improved battery packs adopted by the series subunit are connected, with reference to FIG. 14B; and the C-type improved battery packs adopted by the series subunit are connected, with reference to FIG. 18B.

(3) 97 single battery pack subunit, in which a voltage of each of the single battery pack subunit is 0.12 kV, and each of the single battery pack subunits is independently used as a load power supply for users nearby. The A-type ordinary battery packs adopted by the series subunits are connected, with reference to FIG. 10B; the B-type improved battery packs adopted by the series subunits are connected, with reference to FIGS. 12B and 14B; and the C-type improved battery packs adopted by the series subunits are connected, with reference to FIGS. 16B and 18B.

After the buck station 140 supplies power to the user loads, the corresponding connection mode of the second battery pack unit is as follows:

If the second battery pack unit 142 adopts the A-type ordinary battery packs, the battery packs are connected, with reference to FIGS. 8A and 10A; if the second battery pack unit 142 adopts the B-type improved battery packs, the battery packs are connected, with reference to FIGS. 12A and 14A; and if the second battery pack unit 142 adopts the C-type improved battery packs, the battery packs are connected, with reference to FIGS. 16A and 18A.

Embodiment 2

In this embodiment, the DC power supply 110 on the primary side adopts an isolated photovoltaic power plant, where the isolated photovoltaic power plant has a power of 47.5 MW, an output voltage of 480 V, and an output current of 99000 A.

In the boost station 120, the battery packs in the first battery pack unit 122 is A-type ordinary battery packs with the same specification, where the nominal voltage of each of the battery packs is ≈480 V/1.2=400 V; the optimal charging current of each of the battery packs is 550 A; and the number of the battery packs is 180. Therefore, the sum of the optimal charging current of the first battery pack unit 122 is equal to 6000 A. According to FIG. 7B, each of the A-type ordinary battery packs in the first battery pack unit 122 is connected in parallel, so that the DC power supply 110 on the primary side charges the first storage battery pack unit 122 at full capacity. When the incident light intensity is lower than the nominal light intensity, the battery packs in the boost station perform charging in turns. After the charging on the boost side is completed, the connection mode of each of the A-type ordinary battery packs in the first battery pack unit 122 is changed to a series connection, with reference to FIG. 7A to form a first series stack, so that the first series stack connects to the power grid via the diode to transmit electricity power, where the transmission voltage is 180×400 V=72 kV, and the transmission current is 550 A.

After the boost station 120 performs the power transmission process to the power grid (that is, the charging process on the buck side), the battery packs in the first battery pack unit 122 are connected, with reference to FIG. 7B, and the first battery pack unit 122 reconnects with the power supply 110 on the primary side for charging on the boost side.

There are four buck stations 140, including a buck station 140a, a buck station 140b, a buck station 140c and a buck station 140d, where the composition of the four buck stations is as follows.

In the buck station 140a, all battery packs in the second battery pack unit 142 share the same specification, which can be any one of A-type ordinary battery packs, B-type improved battery packs, and C-type improved battery packs. The nominal voltage of each of the battery packs is 120 V; the optimal charging current of each of the battery packs is 190 A; and the optimal total charging voltage is 72 kV/1.2=60 kV. Therefore, the total number of battery packs is 60 kV/0.12 kV=500, and their total nominal voltage is 500×0.12 kV=60 kV. If the battery packs in the second battery pack unit 142 adopt the A-type ordinary battery packs, the charging on the buck side is performed, with reference to FIGS. 8A and 10A; if the battery packs in the second battery pack unit 142 adopt the B-type improved battery packs, the charging on the buck side is performed, with reference to FIGS. 12A, 13A, 14A and 15A; and if the battery packs in the second battery pack unit 142 adopt the C-type improved battery packs, the charging on the buck side is performed, with reference to FIGS. 16A, 17A, 18A and 19A. After the charging on the buck side is completed, the connection mode of each of the A-type ordinary battery packs in the second battery pack unit 142 is changed according to the user loads and the type of the battery pack. The second battery pack unit 142*a* can be configured as follows.

(1) Two subunits in series connection with 80 battery packs, in which a voltage of each of the two series subunits is 9.6 kV, and the two series subunits can send power to remote users. The A-type ordinary battery packs adopted by the series subunits are connected, with reference to FIG. 10B; the B-type improved battery packs adopted by the series subunits are connected, with reference to FIG. 14B; and the C-type improved battery packs adopted by the series subunits are connected, with reference to FIG. 18B.

(2) Three series subunits with 50 battery packs, in which a voltage of each of the three series subunits is 6 kV, and the three series subunits can send power to user not far from the systems. The connection mode thereof can refer to the connection mode of the series subunit with 80 battery packs.

(3) A series subunit with 10 battery packs, in which a voltage of the series subunit is 0.12 kV, and the series subunit can send power to user not far from the systems. The connection mode thereof can refer to the connection mode of the series subunit with 80 battery packs.

(4) 189 single battery pack subunits, in which a voltage of each of the single battery pack subunits is 0.12 kV, and each of the single battery packs independently used as a load power supply for nearby users. The A-type ordinary battery packs adopted by the subunits are constructed, with reference to FIGS. 8B and 10B; the B-type improved battery packs adopted by the subunits are constructed with reference to FIGS. 12B and 14B; and the C-type improved battery packs adopted by the subunits are constructed with reference to FIGS. 16B and 18B.

After the buck station 140*a* supplies power to the user loads, the connection mode of the second battery pack unit is as follows:

If the second battery pack unit 142 adopts the A-type ordinary battery packs, the battery packs are connected, with reference to FIGS. 8A and 10A; if the second battery pack unit 142 adopts the B-type improved battery packs, the battery packs are connected, with reference to FIGS. 12A and 14A; and if the second battery pack unit 142 adopts the C-type improved battery packs, the battery packs are connected, with reference to FIGS. 16A and 18A.

In the buck station 140*b*, all battery packs in the second battery pack unit 142 share the same specification, which can be any one of A-type ordinary battery packs, B-type improved battery packs, and C-type improved battery packs. The nominal voltage of each of the battery packs is 120 V; the optimal charging current of each of the battery packs is 190 A; and the optimal total charging voltage is 72 kV/1.2=60 kV. Therefore, the total number of the battery packs is 60 kV/0.12 kV=500, and their total nominal voltage is 500×0.12 kV=60 kV. If the battery packs in the second battery pack unit 142 adopt the A-type ordinary battery packs, the charging on the buck side is performed, with reference to FIGS. 8A and 10A; if the battery packs in the second battery pack unit 142 adopt the B-type improved battery packs, the charging on the buck side is performed, with reference to FIGS. 12A, 13A, 14A and 15A; and if the battery packs in the second battery pack unit 142 adopt the C-type improved battery packs, the charging on the buck side is performed, with reference to FIGS. 16A, 17A, 18A and 19A. After the charging on the buck side is completed, the connection mode of each of the A-type ordinary battery packs in the second battery pack unit 142 is changed according to the user loads and the type of the battery pack. The second battery pack unit 142*a* can be configured as follows.

(1) Two series subunits with 40 battery packs, in which a voltage of each of the two series subunits is 7.2 kV, and the two series subunits can send power to remote users. The connection mode thereof can refer to the connection mode of the series subunit with 80 battery packs in the buck station 140*a*.

(2) Four series subunits with 20 battery packs, in which a voltage of each of the four series subunits is 3.6 kV, and the four series subunits can send power to user not far from the systems. The connection mode thereof can refer to the connection mode of the series subunit with 80 battery packs in the buck station 140*a*.

(3) A series subunit with 10 battery packs, in which a voltage of the series subunit is 0.18 kV, and the series subunit can send power to user not far from the systems. The connection mode thereof can refer to the connection mode of the series subunit with 80 battery packs in the buck station 140*a*.

(4) 172 single battery pack subunits, in which a voltage of each of the single battery pack subunit is 0.18 kV, and each of the single battery packs independently used as a load power supply for nearby users. The A-type ordinary battery packs adopted by the subunit are connected, with reference to FIGS. 8B and 10B; the B-type improved battery packs adopted by the subunit are connected, with reference to FIGS. 12B and 14B; and the C-type improved battery packs adopted by the subunit are connected, with reference to FIGS. 16B and 18B.

After the buck station 140*b* supplies power to the user loads, the connection mode of the second battery pack unit is as follows:

If the second battery pack unit 142 adopts the A-type ordinary battery packs, the battery packs are connected, with reference to FIGS. 8A and 10A; if the second battery pack unit 142 adopts the B-type improved battery packs, the battery packs are connected, with reference to FIGS. 12A and 14A; and if the second battery pack unit 142 adopts the C-type improved battery packs, the battery packs are connected, with reference to FIGS. 16A and 18A.

In the buck station 140*c*, the second battery pack unit 142*b* is divided into two types of subunits, where the battery packs in each type of subunits can be any one of A-type ordinary battery packs, B-type improved battery packs, and C-type improved battery packs. In the first specification subunit, the nominal voltage of each of the battery packs is 120 V; the optimal charging current of each of the battery packs is 80 A; the total number of battery packs is 250, and their total nominal voltage is 250×0.12 kV=30 kV. In the second specification subunit, the nominal voltage of each of the battery packs is 300 V; the optimal charging current of each of the battery packs is 80 A; the total number of battery packs is 100, and their total nominal voltage is 100×0.3 kV=30 kV. The first specification subunit and the second specification subunit are connected in series, and thus the total nominal voltage of the second battery pack unit 142*b* is 30 kV+30 kV=60 kV. After the charging on the buck side is completed, the connection mode of each of the A-type ordinary battery packs in the second battery pack unit 142*c* is changed according to the user loads and the connection mode of the buck station 140*a*. The second battery pack unit 142*c* can be configured as follows.

The subunit of the first specification can be configured as follows.

(1) A series subunit with 40 battery packs, in which a voltage of the series subunit is 4.8 kV, and the series subunit can send power to remote users.

(2) Three series subunits with 20 battery packs, in which a voltage of each of the three series subunit is 2.4 kV, and the series subunit can send power to user not far from the systems.

(3) A series subunit with 10 battery packs, in which a voltage of each of the series subunits is 0.18 kV, and the series subunit can send power to a low-voltage DC microgrid for special nearby users.

(4) 149 single battery pack subunits, in which a voltage of each of the single battery pack subunits is 0.12 kV, and each of the single battery packs independently used as a load power supply for nearby users.

The second specification subunit includes 100 single battery pack subunits, in which the nominal voltage of each of the single battery pack subunits is 300 V; the optimal charging current of each of the single battery pack subunits is 80 A; and each of the battery pack subunits is used as a charging pile for electric vehicles.

After the buck station 140c supplies power to the user loads, the connection mode of the second battery pack unit is as follows:

If the second battery pack unit 142 adopts the A-type ordinary battery packs, the battery packs are connected, with reference to FIGS. 8A and 10A; if the second battery pack unit 142 adopts the B-type improved battery packs, the battery packs are connected, with reference to FIGS. 12A and 14A; and if the second battery pack unit 142 adopts the C-type improved battery packs, the battery packs are connected, with reference to FIGS. 16A and 18A.

In the buck station 140d, all battery packs in the second battery pack unit share the same specification, which can be any one of A-type ordinary battery packs, B-type improved battery packs, and C-type improved battery packs. The nominal voltage of each of the battery packs is 300 V; the optimal charging current of each of the battery packs is 80 A; and the optimal total charging voltage is 72 kV/1.2=60 kV. Therefore, the total number of battery packs is 60 kV/0.3 kV=200, and their total nominal voltage is 200×0.3 kV=60 kV. If the battery packs in the second battery pack unit 142 adopt the A-type ordinary battery packs, the charging on the buck side is performed, with reference to FIG. 8A; if the battery packs in the second battery pack unit 142 adopt the B-type improved battery packs, the charging on the buck side is performed, with reference to FIG. 12A; and if the battery packs in the second battery pack unit 142 adopt the C-type improved battery packs, the charging on the buck side is performed, with reference to FIG. 16B. After the charging on the buck side is completed, the connection mode of each of the A-type ordinary battery packs in the second battery pack unit 142 is changed according to the user loads and the type of the battery pack. Specifically, the A-type ordinary battery packs adopted by the second battery pack unit are connected with reference to FIG. 8B; the B-type improved battery packs adopted by the second battery pack unit are connected with reference to FIG. 12B; and the C-type improved battery packs adopted by the second battery pack unit are connected with reference to FIG. 16B. Therefore, each of the battery packs is used as a charging pile for nearby electric vehicles.

After the buck station 140d supplies power to the user loads, the corresponding connection mode is as follows:

If the second battery pack unit 142 adopts the A-type ordinary battery packs, the battery packs are connected, with reference to FIG. 8A; if the second battery pack unit 142 adopts the B-type improved battery packs, the battery packs are connected, with reference to FIG. 12A; and if the second battery pack unit 142 adopts the C-type improved battery packs, the battery packs are connected, with reference to FIG. 16A.

In the buck station, the working current of the buck station 140a is 190 A; the working current of the buck station 140b is 200 A; the working current of the buck station 140c is 80 A; and the working current of the buck station 140d is 80 A; and thus, the total working current of the four buck stations connected in parallel is: 190 A+200 A+80 A+80 A=550 A.

Embodiment 3

In this embodiment, the DC power supply 110 on the primary side includes a first DC power supply 110a, a second DC power supply 11b and a third DC power supply 110c, where the first DC power supply 110a is a photovoltaic power station, which has a power of 4.8 MW, an output voltage of 480 V, and an output current of 10000 A; the second DC power supply 110b is a photovoltaic power station, which has a power of 4.8 MW, an output voltage of 480 V, and an output current of 10000 A; and the third DC power supply 110 is a DC power supply rectified from a hydropower station or a DC power station, which has a power of 6 MW, an output voltage of 480 V, and an output current of 12500 A.

In the boost station 120, the battery packs in the first battery pack unit 122 are A-type ordinary battery packs with the same specification, where the nominal voltage of each of the battery packs is 400 V, the optimal charging current of each of the battery packs is 250 A. The boost substation matched with the DC power supply 110a has 20 battery packs; the boost substation matched with the DC power supply 110b has 40 battery packs; and the boost substation matched with the DC power supply 110c has 50 battery packs. When the incident light intensity is lower than the nominal light intensity, the battery packs in the boost station perform charging in turns. After the three boost substations are charged by their corresponding DC power sources on the primary side, the battery packs in each of the boost substation are changed to be connected in series, and the voltage of each of boost substation is 8 kV, 16 kV and 20 kV, respectively. And then each of the boost substation is connected in series at different places, and is connected to the power grid through the diode for power transmission, where the total voltage is 44 KV, and the transmission current is 250 A.

There are three buck substations, including a first buck substation 140-1, a second buck substation 140-2 and a third buck substation 140-3, where their compositions are as follows.

In the first buck substation 140-1, the battery packs in the first battery pack unit 122 are A-type ordinary battery packs with the same specification, where the nominal voltage of each of the battery packs is 120 V, the optimal charging current of each of the battery packs is 99 A, and the total optimal charging voltage is 44 kV/1.2=36.67 kV; the total number of battery packs is 36.67 kV/0.12 kV=306, and the total nominal voltage is 306×120 V=36.72 kV. After the charging on the buck side is completed, the connection mode of each of the A-type ordinary battery packs in the first buck substation 140-1 is changed according to the user loads and the type of the battery pack. The first buck substation 142-1 can be configured as follows.

(1) A series subunit with 80 battery packs, in which a voltage of the series subunit is 9.6 kV, and the series subunit can send power to remote users.

(2) Two series subunits with 40 battery packs, in which a voltage of each of the two series subunits is 4.8 kV, and the two series subunits can send power to user not far from the systems.

(3) Two series subunits with 10 battery packs, in which a voltage of each of the two series subunit is 0.12 kV, and the two series subunits can send power to closer special users.

(4) 126 single battery pack subunits, in which a voltage of each of the single battery pack subunits is 0.12 kV, and each of the single battery packs independently used as a load power supply for nearby users.

In the second substation 140-2, all battery packs in the second battery pack unit 142 share the same specification, which can be any one of A-type ordinary battery packs, B-type improved battery packs, and C-type improved battery packs. The nominal voltage of each of the battery packs is 120 V; the optimal charging current of each of the battery packs is 69 A; the optimal total charging voltage is 44 kV/1.2=36.67 kV. The total number of the battery packs is 36.67 kV/0.12 kV=306, and their total nominal voltage is 306×0.12 kV=36.72 kV. After the charging on the buck station is completed, the connection mode of each of the battery packs in the second battery pack unit 142 is changed according to the user load and the type of the corresponding battery pack, and the composition is constructed as follows.

(1) A series subunit with 50 battery pack units, in which a voltage of the series subunit is 6.0 kV, and the series subunit can send power to remote users.

(2) Two series subunit with 40 battery packs, in which a voltage of each of the two series subunit is 4.8 kV, and the two series subunit can send power to user not far from the systems.

(3) A series subunit with 10 battery packs, in which a voltage of the series subunit is 0.12 kV, and the series subunit can send power to closer special users.

(4) 166 single battery pack subunits, in which a voltage of each of the single battery pack subunits is 0.12 kV, and each of the single battery packs independently used as a load power supply for nearby users.

In the third substation 140-3, all battery packs in the second battery pack unit 142 share the same specification, which can be any one of A-type ordinary battery packs, B-type improved battery packs, and C-type improved battery packs. The nominal voltage of each of the battery packs is 300 V; the optimal charging current of each of the battery packs is 79 A; the optimal total charging voltage is 44 kV/1.2=36.67 kV; the total number of the battery packs is 36.67 kV/0.3 kV≈122; and their total nominal voltage is 122×300 V=36.6 kV. After the charging on the buck station is completed, the connection mode of each of the battery packs in the second battery pack unit 142 is changed according to the user load and the type of the corresponding battery pack, and the composition is as follows.

122 single battery pack subunits, where a voltage of each of single battery pack subunits is 0.3 kV, and each of the single battery pack subunits is used as a charging pile for nearby electric vehicles.

In the buck station, the working current of the first buck substation 140-1 is 99 A; the working current of the second buck substation 140-2 is 69 A; and the working current of the third buck substation 140-3 is 79 A. Therefore, the total working current of three buck substations connected in parallel is: 99 A+69 A+79 A=247 A.

Embodiment 4

In this embodiment, the full DC buck-boost power transmission system 100 is the same as that in the above-mentioned embodiments, and the DC power supply 110 on the primary side includes a first DC power supply 110-1A, a second DC power supply 110-1B, a third DC power supply 110-1C and a fourth DC power supply 110-1D, where the first DC power supply 110-1A is a photovoltaic power station, which has a power of 24 MW, an output voltage of 480 V, and an output current of 50000 A; the second DC power supply 110-1B is a photovoltaic power station, which has a power of 48 MW, an output voltage of 480 V, and an output current of 100000 A; the third DC power supply 110-1C is a DC power supply rectified from a hydropower station or a DC power station, which has a power of 23 MW, an output voltage of 6300 V, and an output current of 3650 A; and the fourth DC power supply 110-1D is a photovoltaic power station, which has a power of 80 MW, an output voltage of 480 V, and an output current of 166667 A.

There are two boost stations in the embodiment, including the first boost station 120-1 and the second boost station 120-2. The first boost station 121-1 has three boost substations at different places connected in series, including a first boost substation 121-1A, a second boost substation 121-1B, and a third boost substation 121-1C. The battery packs in the first boost substation and the second boost substation are A-type ordinary battery packs with the same specification, where the nominal voltage of each of the battery packs is 400 V, the optimal charging current of each of the battery packs is 400 A. The first boost substation 121-1A matched with the first DC power supply 110-1A has 120 battery packs; and the second boost substation 121-1B matched with the second DC power supply 110-1B has 240 battery packs. The battery packs in the third boost substation 121-1C are A-type ordinary battery packs with the same specification, where the nominal voltage of each of the battery packs=6300/1.2=5250 V; the optimal charging current of each of the battery packs is 400 A; and the number of the battery packs is 9. After the three boost substations are respectively charged by their corresponding DC power supplies on the primary side, the battery packs in the boost station 120 are changed to be connected in series, where the voltage of the boost substations respectively are 120×400 V=48 kV, 240×400 V=96 kV and 9×5250 V=47.25 kV. Each of the boost substations is connected in series at different places, and is connected to the power grid through the diode for power transmission, the total voltage is 191.25 kV, and the current is 400 A. The battery packs in the second boost station 121-2 are A-type ordinary battery pack with the same specification, where the nominal voltage of each of the battery packs is 400 V, and the optimal charging current of each of the battery packs is 347 A. The second boost substation 121-1A matched with the fourth DC power supply 110-2 has 480 battery packs. After the first battery pack unit in the second boost substation 120-2 is charged by the corresponding DC power supply on the primary side, the battery packs are changed to be connected in series, and connected to the power grid through the diode for power transmission, where the voltage is 480×400 V=192 kV, and the current is 347 A. When the incident light intensity is lower than the nominal light intensity, the first boost substation 121-1A, the second boost substation 121-1B and the second boost station 121-2 perform charging in turns.

Therefore, the total current output by the first boost station 120-1 and the second boost station 120-2 is 400 A+347 A=747 A.

In the buck station 140, all battery packs in the second battery pack unit 142 share the same specification, which can be any one of A-type ordinary battery packs, B-type improved battery packs, and C-type improved battery packs. The nominal voltage of each of the battery packs is 400 V; the optimal charging current of each of the battery packs is 746 A; and the optimal total charging voltage is 192 kV/1.2=160 kV; therefore, the total number of battery packs is 160 kV/0.4 kV≈400, and their total nominal voltage is 400×400 V=160 kV. After the charging on the buck side is completed, the connection mode of each of the A-type ordinary battery packs in the second battery pack unit 142 is changed according to the user loads and the type of the battery pack. The second battery pack unit 142 can be configured as follows.

(1) A series subunit with 100 battery packs, in which a voltage of the series subunit is 40 kV, and the series subunit can send power to remote users.

(2) A series subunit with 75 battery packs, in which a voltage of the series subunit is 30 kV, and the series subunit can send power to farther users.

(3) A series subunit with 50 battery packs, in which a voltage of the subunit is 20 kV, and the series subunit can send power to farther users.

(4) Three series subunits with 36 battery packs, in which a voltage of each of the subunit is 14.4 kV, and the three series subunits can send power to farther users.

(5) 67 single battery pack subunits, in which a voltage of each of the single battery pack subunits is 0.4 kV, and each of the single battery pack subunits independently supply power to nearby low-voltage DC microgrids.

Embodiment 5

In this embodiment, the full DC buck-boost power transmission system 100 is the same with the above embodiments, and the DC power supply 110 on the primary side is a photovoltaic power station having a power of 14.4 MW, an output voltage of 480 V, and an output current of 30000 A.

There are two boost stations in the embodiment, including a high voltage boost station 120A and a high current boost station 120B. The high voltage boost substation 120A adopts the A-type ordinary battery packs, where the nominal voltage of each of the battery packs is 400 V; the optimal charging current of each of the battery packs is 200 A; and the number of the battery packs is 150. The high current boost substation 120B adopts the A-type ordinary battery packs, where the nominal voltage of each of the battery packs is 400 V; the optimal charging current of each of the battery packs is 600 A; and the number of the battery packs is 50. The A-type ordinary battery packs in the above-mentioned two boost stations are defined as shown in FIG. 4, and connected in parallel according to FIG. 7B. If the sum of the optimal charging current after the two boost stations are connected in parallel is equal to 30000 A, the power supplies on the primary side can respectively charge the battery packs at full capacity. After the charging is completed, when the DC power supply 110 on the primary side is matched with the high voltage boost station 120A, all battery packs are changed to form three first series stacks, with reference to FIGS. 7A and 2C, where each of the first series stacks includes 52 battery packs with a voltage of 50×400 V=20 kV; each of the first series stack is connected to the power grid through the diode for power transmission, where the voltage is 50×400 V=20 kV, and the current is 200 A. when the DC power supply 110 on the primary side is matched with the high current boost station 120B, all 50 battery packs are connected in series after being charged, and connected to the power grid through the diode for power transmission, where the voltage is 50×400 V=20 kV, and the current is 600 A. When the incident light intensity is lower than the nominal light intensity, the high voltage boost substation 121A and the high current boost substation 121B perform charging in turns.

In the buck station, all battery packs in the second battery pack unit 140 share the same specification, which can be any one of A-type ordinary battery packs, B-type improved battery packs, and C-type improved battery packs. The nominal voltage of each of the battery packs is 120 V; the optimal charging current each of the battery packs is 198 A, which is slightly less than the current delivered by the high voltage boost station, and slightly less than one-third of the current delivered by the high current boost station. The optimal total charging voltage is 20 kV/1.2=16.67 kV; the total number of battery packs is 16.67 kV/0.12 kV=139, and their total nominal voltage is 139×0.12 kV=16.68 kV. After the charging on the buck side is completed, the connection mode of each of the A-type ordinary battery packs is changed according to the user loads and the type of the battery pack. The second battery pack unit can be configured as follows.

(1) A series subunit with 20 battery packs, in which a voltage of the series subunit is 1.2 kV, and the series subunit can send power to user not far from the systems.

(2) Three series subunits with 10 battery packs, in which a voltage of each of the three series subunit is 1.2 kV, and the three series subunits can send power to user not far from the systems.

(3) 89 single battery pack subunits, in which a voltage of each of the single battery pack subunits is 0.12 kV, and each of the single battery packs independently used as a load power supply for nearby users.

The above-mentioned full DC buck-boost power transmission system 100 is applied to an isolated photovoltaic power station to continuously supply power to electrical loads. The two boost stations 120A and 120B are equivalent for the same buck station.

Embodiment 6

In this embodiment, the DC power supply 110 on the primary side is a photovoltaic power station or a wind turbine generator.

When the DC power supply 110 is a photovoltaic power station, the DC power supply 110 has a power of 2.4 MW, an output voltage of 960 V, and an output current of 2500 A.

In the buck station 140, the battery packs in the second battery pack unit 142 can be any one of A-type ordinary battery packs, B-type improved battery packs, and C-type improved battery packs. The nominal voltage of each of the battery packs is 120 V. The battery packs in the second battery pack unit 142 are constructed according to the optimal charging current as follows.

There are 277 series subunits consisting of 7 battery packs with the optimal charging current of 9 A, where the total nominal voltage of each of the series subunit is 840 V. All the 277 series subunits are connected in parallel for charging. The A-type ordinary battery packs adopted by the series subunits is connected in series, with reference to FIG. 10A; the B-type improved battery packs adopted by the series subunits are connected in series, with reference to FIG. 14A;

and the C-type improved battery packs adopted by the series subunits are connected in series, with reference to FIG. 18A.

After the charging is completed on the buck side, the buck station 140 is disconnected from the photovoltaic power station, and the 277 series subunits are separated from each other. Therefore, the battery packs in each of the series subunits are separated from each other, and are connected in parallel, so that each of the series subunits is divided into 7 single battery pack subunits, and each of the single battery pack subunits independently supplies power to a user, where the total number of the users is 7×277=1939; the total current is 277×9 A=2493 A; and the distance of the users from the buck station 140 is less than 1 km.

When the DC power supply 110 is a wind turbine generator with a DC output without inverter, the DC power supply 110 has a power of 1 MW, an output voltage of 480 V, and an output current of 2083 A.

In the buck station 140, the battery packs in the second battery pack unit 142 can be any one of A-type ordinary battery packs, B-type improved battery packs, and C-type improved battery packs. The nominal voltage of each of the battery packs is 100 V. The battery packs in the second battery pack unit 142 are constructed according to the optimal charging current as follows.

(1) 100 series subunits consisting of 4 battery packs with the optimal charging current of 8 A.

(2) 88 series subunits consisting of 4 battery packs with the optimal charging current of 10 A.

(3) 32 series subunits consisting of 4 battery packs with the optimal charging current of 12 A.

The nominal voltage of each of the series subunits is 400 V, and all the series subunits are connected in parallel for charging.

After the charging on the buck side is completed, each of the series subunits is disconnected from the wind turbine generator; the battery packs in each of the series subunits are also disconnected from each other, so that each of battery packs independently supplies power to a user, where the distance of the users from the buck station 140 is less than 0.3 km; a total number of users is 4×(100+88+32)=880; and the total current is 100×8 A+88×10 A+32×12 A=2064 A.

Embodiment 7

In this embodiment, the DC power supply 110 on the primary side are a plurality of wind turbine generators sending out pulsating DC. There are 22 wind turbine generators in the wind farm, each of the wind turbine generators has a power of 0.96 MW, an output voltage of 480 V, and an output current of 2000 A; and the nominal power of the wind farm is 21.12 MW. The 22 wind turbine generators are distributed in a strip shape, where the distance between adjacent generators is about 100 m, and the distance between the two furthest generators is about 2000 m.

The boost station 120 is established in a manner that the low voltage DC power source or the DC power station continuously and steadily supplies power to the boost station. Since the battery packs connected in series in the boost station 120 are usually excessive, the discharge current of the boost station should not be too large. It is assumed that each of the wind turbine generators is provided with a boost substation, and each of the boost substations charges 10 battery packs of the same model connected in parallel, then the nominal current of each of the battery packs is 200 A, and the nominal voltage is 480 V/1.2=400 V. The A-type ordinary battery pack is defined, with reference to FIG. 4. According to FIGS. 3B and 7B and their descriptions, the A-type ordinary battery packs are connected in parallel for charging from the wind turbine generators. After being charged, each of the boost substations changes to be connected in series to form a second series sub-stack, with reference to FIG. 7A, where the voltage of each of the second series sub-stack is 4000 V, and the nominal current of each of the second series sub-stack is 200 A. The second series sub-stacks in the 22 boost substations are connected in series according to the method as shown in FIG. 3A, so that a voltage of the boost station 120 is 22×4000 V=88000 V; and the power that can be transmitted is greater than 17600 kW after the boost station are connected to the power grid.

The industrial applicability of various types of power transmission systems of the present disclosure are introduced when explaining the full DC buck-boost power transmission system 100 in the above-mentioned embodiments.

In order to implement the full DC buck-boost power transmission system 100 of the present disclosure, the power grid is provided with the following characteristics: a battery pack in the first battery pack unit 122 for boosting is disconnected from the power grid when charging on the boost side, and they are connected to the power grid only when they charge the battery packs in the second battery pack unit 142 on the buck side. The battery packs in the second battery pack unit 142 for bucking is connected to the power grid only when they need to be charged, and they are disconnected from the power grid when supplying power to the loads. Therefore, if the power grid fails, the power station can continue to work, where the battery packs in the first battery pack unit 122 can continue to be charged, and the battery packs in the second battery pack unit 142 can continue to supply power to the loads. Therefore, the power supply system has the advantages of safe, easy to handle power grid accidents, and simple and reliable control and management system.

The present disclosure tightly combine power generation, energy storage and power supply, and has strong resistance to fluctuations in the power generation terminal and the user terminal.

The present disclosure can obtain high-quality DC power and eliminate various types of AC harmonics.

Instead of the DC to AC and AC to DC conversions, the present disclosure relies on the conversion between electrical and chemical energy. The full DC buck-boost power transmission system is more energy-saving if high quality and high energy storage density are adopted. At present, AC power generation occupies a great advantage in the global power supply. However, it is feasible and advantageous to adopt the full DC buck-boost power transmission system 100 of the present disclosure to establish the micro-grid and local power grid by using various renewable energy power stations. As a result, the development of the technologies such as detection, control, management, maintenance and overhaul will be promoted, which in turn provides mature technologies and experience for the establishment of cross-regional and even global DC power grid.

What is claimed is:

1. A full DC boost-buck power transmission system, comprising:
    at least one DC power supply;
    at least one boost station;
    a high-voltage cable; and
    at least one buck station;
    wherein the at least one DC power supply, the at least one boost station, the high-voltage cable and the at least one buck station are electrically connected in sequence; the at least one boost station comprises a first battery pack unit; the at least one buck station comprises a second battery pack unit;

when the at least one boost station is electrically connected to the at least one DC power supply; and the first battery pack unit comprises a plurality of battery packs that are connected in parallel for charging on a boost side;

when the charging on the boost side is completed, the at least one boost station is disconnected from the at least one DC power supply; a connection mode of the battery packs in the first battery pack unit is switched from parallel connection to series connection; and the battery packs in the first battery pack unit are electrically connected to the at least one buck station through the high-voltage cable;

the second battery pack unit comprises a plurality of battery packs that are connected in series for charging on a buck side;

when the charging on the buck side is completed, the at least one buck station is disconnected from the high-voltage cable; and a connection mode of the battery packs in the second battery pack unit is switched such that the second battery pack unit comprises at least one single battery pack subunit, at least one series subunit and at least one parallel subunit which are respectively configured for power supply to their corresponding loads.

2. The full DC boost-buck power transmission system of claim 1, wherein after the charging on the buck side is completed, the at least one boost station is disconnected from the high-voltage cable; the battery packs in the first battery pack unit are connected in parallel and the at least one DC power supply is electrically connected to the at least one boost station for charging on the boost side again;

after the charging on the boost side is completed, the at least one boost station is disconnected from the at least one DC power supply again; the connection mode of the battery packs in the first battery pack unit is switched from parallel connection to series connection;

after the power supply from the at least one buck station is completed, the battery packs in the second battery pack unit are connected in series and electrically connected to the at least one boost station through the high-voltage cable, so as to perform charging on the buck side again.

3. The full DC boost-buck power transmission system of claim 1, wherein each of the at least one single battery pack subunit, each of the at least one series subunit and each of the at least one parallel subunit are respectively configured for power supply to a power grid whose voltage value is lower than the voltage outputted from the at least one DC power supply.

4. The full DC boost-buck power transmission system of claim 1, wherein if there are a plurality of boost stations, a total nominal voltage of the first battery pack units in the plurality of boost stations is within a first preset reference voltage range; and if there are a plurality of buck stations, a total nominal voltage of the second battery pack units in the plurality of buck stations is within a second preset reference voltage range.

5. The full DC boost-buck power transmission system of claim 1, wherein if there are a plurality of DC power supplies and a plurality of boost stations, each of the plurality of boost stations is electrically connected to a corresponding DC power supply.

6. The full DC boost-buck power transmission system of claim 1, wherein if there are a plurality of boost stations, the first battery pack unit in each of the plurality of boost stations and the second battery pack unit adopt A-type ordinary battery packs; when charging on the buck side, a first unidirectional conductive element that only allows current to flow into the high-voltage cable is respectively provided between a positive electrode of a first series stack formed by the first battery pack unit in each of the plurality of boost stations and the high-voltage cable; and a second unidirectional conductive element that only allows current to flow out of the high-voltage cable is provided between the high-voltage cable and a positive electrode of a second series stack formed by the second battery pack unit.

7. The full DC boost-buck power transmission system of claim 1, wherein if there are a plurality of boost stations, the first battery pack unit in each of the plurality of boost stations adopts A-type ordinary battery packs, and the second battery pack unit adopts B-type improved battery packs, wherein a third unidirectional conductive element that only allows current to flow into the battery pack is provided at a positive electrode of each of the B-type improved battery packs.

8. The full DC boost-buck power transmission system of claim 1, wherein if there are a plurality of boost stations, the first battery pack unit in each of the plurality of boost stations adopts A-type ordinary battery packs, and the second battery pack unit adopts C-type improved battery packs, wherein a fourth unidirectional conductive element that only allows current to flow into the battery pack is provided at a positive electrode of each of the C-type improved battery packs.

9. The full DC boost-buck power transmission system of claim 1, wherein the at least one boost station comprises a plurality of boost substations connected in series; the plurality of boost substations are respectively installed at different locations, and a sum of output voltage of a first series sub-stack of the battery packs in each of the plurality of boost substations is equal to a total nominal voltage of the first battery pack unit.

* * * * *